US009088168B2

(12) United States Patent
Mach et al.

(10) Patent No.: US 9,088,168 B2
(45) Date of Patent: Jul. 21, 2015

(54) SYSTEM AND METHOD FOR PROVIDING AND CONTROLLING INDUCTIVE POWER CHARGING

(71) Applicant: POWERMAT TECHNOLOGIES, LTD., Neve Ilan (IL)

(72) Inventors: Elieser Mach, Rosh Tzurim (IL); Oz Moshkovich, Rehovot (IL); Ian Podkamien, Petach Tikva (IL); Yuval Koren, Rehovot (IL)

(73) Assignee: Powermat Technologies, Ltd., Neve Ilan (IL)

( * ) Notice: Subject to any disclaimer, the term of this patent is extended or adjusted under 35 U.S.C. 154(b) by 0 days.

(21) Appl. No.: 14/273,280

(22) Filed: May 8, 2014

(65) Prior Publication Data

US 2014/0239733 A1 Aug. 28, 2014

Related U.S. Application Data

(63) Continuation of application No. PCT/IL2013/050028, filed on Jan. 8, 2013.

(60) Provisional application No. 61/584,268, filed on Jan. 8, 2012, provisional application No. 61/682,604, filed on Aug. 13, 2012, provisional application No. 61/726,855, filed on Nov. 15, 2012.

(51) Int. Cl.
| | |
|---|---|
| *H01F 27/42* | (2006.01) |
| *H01F 37/00* | (2006.01) |
| *H01F 38/00* | (2006.01) |
| *H02J 5/00* | (2006.01) |
| *H02J 17/00* | (2006.01) |
| *H02J 7/02* | (2006.01) |

(52) U.S. Cl.
CPC .............. *H02J 5/005* (2013.01); *H02J 7/025* (2013.01); *H02J 17/00* (2013.01)

(58) Field of Classification Search
CPC ........... H02J 17/00; H02J 7/025; H02J 5/005; H02J 5/00; H02J 7/0052; H02J 7/007; H03H 7/40
USPC ......................................................... 307/104
See application file for complete search history.

(56) References Cited

U.S. PATENT DOCUMENTS

| | | | |
|---|---|---|---|
| 8,731,116 B2 * | 5/2014 | Norconk et al. .............. 375/342 |
| 2006/0145660 A1 | 7/2006 | Black | |
| 2007/0103110 A1 | 5/2007 | Sagoo | |
| 2010/0036773 A1 | 2/2010 | Bennett | |
| 2011/0221391 A1 | 9/2011 | Won | |

OTHER PUBLICATIONS

International Search Report dated Jun. 18, 2013, for corresponding Application PCT/IL2013/050028.

* cited by examiner

*Primary Examiner* — Carlos Amaya
(74) *Attorney, Agent, or Firm* — Brooks Kushman P.C.

(57) ABSTRACT

The disclosure relates to inductive charging systems comprising at least one power access point (PAP) comprising a primary inductor connectable to a power supply, a PAP credential characterizing said PAP and a charger link comprising at least one wireless communication component; at least one device comprising a secondary inductor, a device credential characterizing said device and a device link comprising at least one wireless communication component; and a power controller comprising a communicator comprising at least one wireless communication component and a server having a database. The disclosure further relates to methods of controlling the inductive charging performed by an inductive charging system.

30 Claims, 26 Drawing Sheets

SYSTEM AND METHOD FOR PROVIDING AND CONTROLLING INDUCTIVE POWER CHARGING

CROSS-REFERENCE TO RELATED APPLICATIONS

This application is a continuation of PCT/IL2013/050028 filed Jan. 8, 2013, which, in turn, claims the benefit of U.S. Provisional Patent Application 61/584,268, filed Jan. 8, 2012, U.S. Provisional Patent Application 61/682,604 filed Aug. 13, 2012, and U.S. Provisional Patent Application 61/726,855 filed Nov. 15, 2012, the disclosures of which are hereby incorporated in their entirety by reference herein.

FIELD OF THE DISCLOSURE

The disclosure herein relates to systems and methods for providing access to charging power. In particular the disclosure relates to providing and controlling charging power to mobile electrical devices.

BACKGROUND

The proliferation of mobile devices such as mobile handsets, media players, tablet computers and laptops/notebooks/netbooks and ultra-books increases user demand for access to power points at which they may power or charge mobile devices while out and about or on the move.

There is a need for systems that conveniently provide the opportunity to power or charge the mobile devices in public spaces, in which the user of the mobile spaces may remain for extended periods of time, say more than a few minutes or so. Amongst others, such public settings may include restaurants, coffee shops, airport lounges, trains, buses, taxis, sports stadia, auditoria, theatres, cinemas or the like. Further, there is a need for such systems to enable tracking of individual mobile devices, in order to provide a platform for monitoring system usage and arranging payment for the charging/powering service.

The disclosure below addressed the above-described needs.

SUMMARY OF THE EMBODIMENTS

It is according to one aspect of the current disclosure to present an inductive charging system to provide power to mobile electrical devices and controlling the inductive power charging. The mobile device may be operable to execute a provisioning software for paid charging, enabling to monitor and control power charging. The charging system may further allow a power provider to manage the power provision.

The inductive charging system may be operable to provide power to at least one electrical device characterized by a device credential. The inductive charging system may comprise at least one power access point (PAP) comprising a primary inductor connectable to a power supply, the primary inductor operable to inductively couple with a secondary inductor associated with the electrical device, a PAP credential characterizing the PAP, and a charger link comprising at least a first wireless communication component operable to communicate with at least a second wireless communication component associated with the electrical device via a device link; and a power controller comprising a communicator comprising at least one wireless communication component and a server having a database.

Some charging systems may comprise at least one power access point (PAP) comprises a primary inductor connectable to a power supply, a PAP credential characterizing the PAP and a charger link that comprises at least one wireless communication component and at least one device comprises a secondary inductor, a device credential characterizing the device and a device link that comprises at least one wireless communication component. The charging system also comprising a power controller comprises a communicator that comprises at least one wireless communication component and a server having a database.

Optionally, the inductive charging system, in which the charger link or the device link comprises at least one wireless communication component, each may be selected from a group consisting of a wireless local area network (WLAN) transceiver, a mobile data network transceiver, a near field communication (NFC) tag, an NFC reader, an RFID tag, and RFID reader, an optical signal transmitter, an optical detector, a sound generator, and a sound receiver.

Optionally, the inductive charging system, in which the communicator comprises at least one wireless communication component, may be selected from a group consisting of a WLAN transceiver and a mobile data network transceiver.

Optionally, the WLAN transceiver, as a wireless communication component, may be selected from a group consisting of a WiFi transceiver, a Zigbee transceiver, a Z-wave transceiver and a 6LowPAN transceiver.

Optionally, a mobile network transceiver may be selected from a group consisting of a 2G transceiver, a 3G transceiver and a 4G transceiver.

Optionally, the charging system database comprises of a plurality of device credentials, each device credential characterizing one of a plurality of devices, a plurality of PAP credentials, each PAP credential characterizing one of a plurality of PAPs, at least one device ancillary status associated with each of the plurality of device credentials, and at least one PAP ancillary status associated with each of the plurality of PAP credentials, and additionally, the server is capable of determining a charging allocation based on a pairing of one of the plurality of device credentials with one of the plurality of PAP credentials.

Optionally, the connection of the primary inductor to the power supply of the charging system may be controlled by a power relay selectable to be in an OFF state or and ON state, where the state of the power relay is determined by the charging allocation determined by the server.

Optionally, the state of the power relay of the charging system is determined by the charging allocation less the metering data reflecting the amount of charging dispensed by the PAP. The charging allocation may be characterized as a first duration of time, and alternatively may be characterized as a first amount of electrical energy. The metering data may be characterized as a second duration of time, and alternatively may be characterized as a second amount of electrical energy.

In various embodiments of the disclosure, controlling of the inductive charging system as described herein may possibly be performed by different methods running on a data processor, such as a computing platform or distributed computing system for executing a plurality of instructions.

The method of controlling the inductive charging comprising the steps of providing a PAP credential characterizing the PAP, providing a device credential characterizing the device, the charger link transmitting the PAP credential to the device link, the device link transmitting the PAP credential and the device credential to the communicator and the server receiving the PAP credential and the device credential from the communicator and determining a charging allocation.

The communicator may transmit an initiation signal to the power relay such that the power relay connects the primary inductor from the power supply if the charging allocation is greater than null. Additionally, the power meter may wirelessly transmit to the communicator a metering data reflecting the amount of charging dispensed by the PAP, and the server may compare the charging allocation to the metering data, such that the communicator transmits a termination signal to the power relay such that the power relay disconnects the primary inductor from the power supply if the metering data exceeds the charging allocation.

Additionally or alternatively, controlling the inductive charging is performed by another method comprising the steps of a user entering a PAP credential into the device through the PAP credential input, providing a device credential characterizing the device, the device link transmitting the PAP credential and the device credential to the communicator, the server receiving the PAP credential and the device credential from the communicator and determining a charging allocation.

The communicator may transmit an initiation signal to the power relay such that the power relay connects the primary inductor from the power supply if the charging allocation is greater than null. Additionally, the method may further comprise the steps of a power meter wirelessly transmitting to the communicator a metering data reflecting the amount of charging dispensed by the PAP, and the server comparing the charging allocation to the metering data, such that the communicator transmits a termination signal to the power relay such that the power relay disconnects the primary inductor from the power supply if the metering data exceeds the charging allocation.

Additionally or alternatively, controlling the inductive charging may be performed by yet another method comprising the steps of providing a PAP credential characterizing the PAP, providing a device credential characterizing the device, the device link transmitting the PAP credential to the charger link, the charger link transmitting the PAP credential and the device credential to the communicator, the server receiving the PAP credential and the device credential from the communicator and determining a charging allocation.

The communicator may transmit an initiation signal to the power relay such that the power relay connects the primary inductor from the power supply if the charging allocation is greater than null. Additionally the method further comprising the steps of a power meter wirelessly transmitting to the communicator a metering data reflecting the amount of charging dispensed by the PAP and the server comparing the charging allocation to the metering data, such that the communicator transmits a termination signal to the power relay such that the power relay disconnects the primary inductor from the power supply if the metering data exceeds the charging allocation.

Additionally or alternatively, controlling the inductive charging may be performed by yet another method comprising the steps of providing a PAP credential characterizing the PAP, providing a device credential characterizing said device, the charger link transmitting the PAP credential to the device link, the device link transmitting the PAP credential and the device credential to the communicator, the server receiving the PAP credential and the device credential from the communicator and determining a charging allocation.

The communicator may transmit an initiation signal to the device link, the device link then transmits the initiation signal to the charger link. The power relay being wired to the charger link and receiving the initiation signal from the charger link such that the power relay connects the primary inductor from the power supply if the charging allocation is greater than null. Additionally, the method further comprises the steps of a power meter providing to the charger link a metering data reflecting the amount of charging dispensed by the PAP, the charger link transmitting the metering data to the device link, the device link transmitting the metering data to the communicator, the server comparing the charging allocation to the metering data, such that the communicator transmits a termination signal to the device link if the metering data exceeds the charging allocation, the device link transmitting the termination signal to the charger link, the power relay receiving the termination signal from the charger link such that the power relay disconnects the primary inductor from the power supply.

It is noted that wherein reference is made to the charging allocation, it may be characterized as a first duration of time, and wherein reference is made to the metering data it may be characterized as a second duration of time.

It is further noted that wherein reference is made to the charging allocation may be characterized as a first amount of electrical energy, and wherein reference is made to the metering data it may be characterized as a second amount of electrical energy.

BRIEF DESCRIPTION OF THE DRAWINGS

For a better understanding of the embodiments and to show how it may be carried into effect, reference will now be made, purely by way of example, to the accompanying drawings.

With specific reference now to the drawings in detail, it is stressed that the particulars shown are by way of example and for purposes of illustrative discussion of selected embodiments only, and are presented in the cause of providing what is believed to be the most useful and readily understood description of the principles and conceptual aspects. In this regard, no attempt is made to show structural details in more detail than is necessary for a fundamental understanding; the description taken with the drawings making apparent to those skilled in the art how the several selected embodiments may be put into practice. In the accompanying drawings:

FIG. 8I is a possible notification message overlaid upon a home screen of a communications device, such as a mobile phone or the like;

DETAILED DESCRIPTION

Figure 1A:
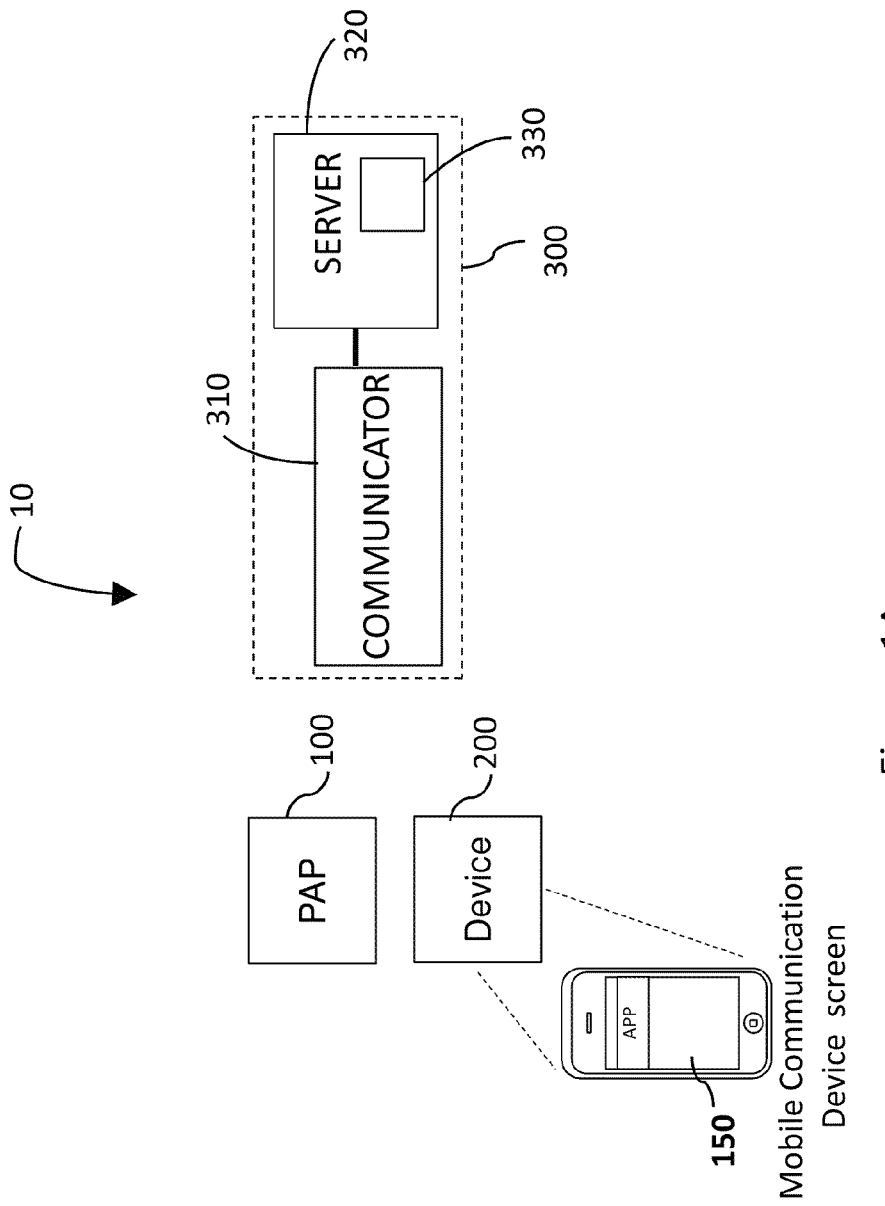
FIG. 1A is a block diagram representing an inductive charging system.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Aspects of the present disclosure relate to providing charging power to mobile electrical devices, and controlling the power charging between the electrical devices and a power access point. The charging system of the current disclosure may use at least one power access point, with possible functionality of communicating with a remote management server, to allow a user to power or charge an electrical mobile device such as a mobile phone or the like. The mobile device may be operable to execute a provisioning software for paid charging, enabling to control power charging through various methods as described hereinafter. The charging system may further allow a power provider to manage the power provision.

The mobile electrical device may be referred to herein as, variously, a "user device", an "electrical device", a "mobile device", a "communication device" or a "device". The device may be an electronic device with a battery, e.g., a mobile handset, a media player, a tablet computer, a laptop/notebook/netbook/ultra-book, a PDA or the like. Alternatively, the device may be an accessory with a battery, such as earphones and the like, or a stand-alone battery. As a further alternatively, the device may be any powered device, including electronic devices without a battery.

The power access point may be referred to herein as, variously, a "PAP", a "Hotspot" or a "charger".

It is noted that the systems and methods of the disclosure herein may not be limited in its application to the details of construction and the arrangement of the components or methods set forth in the description or illustrated in the drawings and examples. The systems and methods of the disclosure may be capable of other embodiments or of being practiced or carried out in various ways.

Alternative methods and materials similar or equivalent to those described herein may be used in the practice or testing of embodiments of the disclosure. Nevertheless, particular methods and materials are described herein for illustrative purposes only. The materials, methods, and examples are not intended to be necessarily limiting.

The proliferation of mobile electronic devices such as mobile handsets, media players, tablet computers and laptops/notebooks/netbooks and ultra-books increases user demand for access to power points at which they may power or charge mobile devices while out and about or on the move.

Public spaces, in which consumers may remain for extended periods of time, say more than a few minutes or so may represent convenient sites for the provision of power, offering the consumer the opportunity to power or charge the mobile devices. Amongst others, such public settings may include restaurants, coffee shops, airport lounges, trains, buses, taxis, sports stadia, auditoria, theatres, cinemas or the like.

It is noted that the provision of a paid service for the provision of power in such locations may provide a revenue stream to location operators and may be offered as a direct incentive to related purchases.

In order to enable this type of model, a simple and convenient method may be required for associating a user with a specific charged device and to a specific charging outlet (wired or wireless) and to resolve payment and billing information retrieval.

The current disclosure relates to a system for enabling this task to be accomplished automatically and with no user intervention. The system may utilize preexisting transmitters that may be common amongst many mobile electronic devices with additional software management applications to them. Such an implementation may allow for the mass deployment of the system with little or no additional cost or inconvenience to the user.

It is particularly noted that although described primarily in relation to inductive power chargers, the current disclosure may apply to any power providing schemes and are not limited to say wired or wireless charging schemes.

The system may include a plurality of power access points (which may also be referred to as PAPs, hotspots or chargers), a user device (which may also be referred to as a "device") and a management server (which may also be referred to as a "control server" or a "server").

The power access points may include an identification module, a close communication module or the like. They may optionally also include a wireless LAN/WAN transmission unit.

The mobile device may further be operable to execute a provisioning software for paid charging, enabling the monitoring and controlling of power charging. Such a provisioning software may be an application that is preinstalled or accessed via a computer network such as by downloading from a so called 'apps store' or operating as a web-based application. Further, the operation of the device, in relation to the charging system described herein, may be controlled by software embedded within the OS of the device, the application programming interface (API) of the device OS, or firmware. The provisioning software may be distributed among a combination of: software embedded within the OS; the application programming interface (API) of the device OS, firmware, a pre-installed or downloaded application; and/or a web-based application. For example, the interaction of the device user with the charging system may be mediated with a preinstalled or downloaded application, while the interaction of the device with the other components of the charging system such as the PAP and the server may be mediated through OS-embedded software.

The provisioning software may run on a device having a user interface. Alternatively, the device may not have a user interface.

The provisioning software may be automatically launched when charging is initiated on the device. Alternatively the user may launch the provisioning software, and then allow the charging of the device to commence.

Optionally, the device may have a wireless LAN/WAN communication unit, which does not necessarily have to match the LAN/WAN transmission unit of the power access point. Furthermore, the device may include a close communication module capable of communicating with the module on the power access point.

The management or control server may be in communication with the power access point, the device, or both. The communication channel may be mediated by wireless access points, cellular networks, wired networks or the like that may provide an internet protocol (IP) connection to at least one of the device or the power access point. It is further noted that optionally, the communication channel to the power access point may be mediated indirectly via the device and the close communication module. Similarly, the communication channel to the device may be mediated indirectly via the power access point.

Each device may have a unique identifier, which may be referred to as a receiver identification (RxID) or device credential (DC), in the system that allows the recognition thereof. The RxID may be a MAC address. The server may store user or device related information in addition to the RxID, such as billing information, user credits or the like. In some embodiments, the server may be further connected to a point of purchase cashiers to allow for user credits to be acquired.

Where appropriate, power access points may have a unique identifier, which may be referred to as a transmitter identification (TxID) or PAP credential (PC), in the system that allows the recognition thereof.

For illustrative purposes only, possible methods for providing access to power for electrical devices in public spaces are presented hereinafter. The method may allow a user to power or charge an electrical device such as a mobile phone or the like from a power access point and may further allow a power provider to manage the power provision.

A user may place or connect a device to a power access point. For example an inductively enabled device may be placed upon an inductive power outlet. Alternatively, or additionally, a power supply may be conductively connected to an electrical device.

The power access point may detect the device connection. For example, wired connection may be detected by detecting the load and wireless connection may be detected using various remote sensors such as hall sensors, analog ping schemes or the like.

The power access point may enable power supply and charging for a predefined time $T_{free}$ during which time period user credentials may be authenticated.

Optionally, the power access point may transmit a random pattern to the device via the close communication. The power access point may further transmit that same pattern to a control server via a WAN/LAN connection.

For example, a software application running on the device may be operable to receive the pattern and to relay the same pattern to the server along with a user identification token.

Variously, the server and device may exchange multiple messages to complete authentication of the user.

The server may thereby be able to associate the specific power access point with the specific device. If the user is deemed permitted to use the service the server may send a confirmation signal allowing the power access point to continue servicing the device. Where required, the confirmation signal may define a specific time period for which the service is granted or send a disconnect event on termination of that time.

Where appropriate, the server may additionally or alternatively define multiple levels of service for example as expressed in terms of current provided to different users. By way of example paying users may be enabled to access full powering capability, perhaps up to 20 W or so, while non-paying users may be provided limited access to say 0.5 W which may be sufficient to charge only low power devices or perform trickle charge for completely depleted batteries.

During operation the power access point may be operable to receive operating signals from the control server. According to the operating signals received, the power access point may be operable to perform various actions such as to continue providing power, to abort power provision, to modify the service in some way or the like.

As noted herein, various methods may be implemented for enabling close communication between the device and the power access point.

In one particular embodiment, the close communication channel between the device and power access point may be based upon audio signals sensed via a microphone of the device, for example using specific audible bands, 300 Hz-20 khz, say. The audio signal may be emitted from an audio emitter such as a speaker or the like associated with the power access points. Many electrical devices, such as mobile phones and the like have microphone and software applications may have access to the microphone.

It is noted that powering the microphone unit may itself demand power. Consequently, the software application running on the device may activate the microphone only where 'a-charge-connect' event is detected in the system. Accordingly, upon device detection the power access point may provide an initial charging power to power the microphone. After a short interval, an identification signal may be sent via the audio signal.

The audio signal may include additional tones that are not related to the communication pattern which may mask the random patterns communicated. For example, an audio identification signal may be masked by a connection tone serving to provide users with an indication that a connection has been made.

Alternatively or additionally, the close communication channel may be provided by the power access point alternating the activation of charging power to the device. The alternation of power supply is detected by most devices as charger connection and disconnection events that are communicated to the application layer on these devices.

The switching pattern may be coded with an identification signal such as the random pattern. The power access point may need to perform this switching in intervals spaced sufficiently apart to allow the devices to detect and report to application level charger connection and disconnection events.

Still other embodiments may use Bluetooth or Near Field Communication (NFC) to achieve the close communication channel. These could be combined with the basic power signal to trigger their activation thereby conserving power.

In various embodiments of this system the LAN/WAN interface of the device may be WLAN or Cellular 2G/3G/4G connections. The connection to the WLAN or Cellular access point may also include manual or automatic insertion of user credentials. In this case the information may be conveyed to the system server to enable user identification. The information provided in order to allow access may also be stored by the device application and later provided directly to the system server.

Additionally, or alternately the LAN/WAN connection of the power access point may be achieved via the charged device. The power access point may encrypt messages to the server and deliver this to the application on the device via the close communication channel therebetween. The application may then send the message to the server via its LAN/WAN connection.

Encrypted Instructions from the server to the power access point may be delivered back to the charged device which will relay them to the power access point via the close communication channel.

Where applicable, the encryption may only allow the server and power access point to encrypt/decrypt the messages but would prevent the charged device from altering or creating a legal message. Accordingly, the transfer of the messages from server to power access point may require the existence of a bidirectional close communication channel. For audio signals this may be achieved by using the device speaker and including a microphone on the power access point.

Additionally or alternatively, a bidirectional power based signaling scheme may be achieved by modulating the load of the device on the power access point. As many devices do not allow applications to directly control the charging current used or the system load, it may be required to use some indirect techniques such as modulating screen illumination back light for LCD and direct pixel activation for OLED to vary the load.

It is further noted that inductive power transfer systems may offer additional options for close communication channels.

Inductive Charging System

Referring to FIG. 1A, the disclosure provides an inductive charging system 10 that includes at least one power access point (PAP) 100 comprising a primary inductor capable of inductively coupling with a secondary inductor and further connectable to a power source, and a power controller 300. The inductive charging system may further comprise a device 200 comprising a secondary inductor connected to a load and capable of coupling with a primary inductor. The PAP may, alternatively, be referred to as a hotspot (HS). The PAP may further include and LED display operable to display on/off/dimmer/fade-in-out signals.

Further, each device 200 may have a unique identifier, which may be referred to as a device credential (DC) or a receiver identification (RxID). The device credential may be identified by a PAP 100 when the device 200 and PAP 100 are in close proximity. The PAP 100 may have a unique identifier, which may be referred to as a PAP credential (PC) or a transmitter identification (TxID). The PAP credential may be identified by the device 200. Further, the PAP 100, the device 200, or both may be capable of communicating wirelessly to the power controller 300, which may include a server 320 having a central database 330) in order to, variously, report PAP 100 identifiers and/or device 200 identifiers, report PAP usage, and the like, and to receive permission commands, on/off commands and the like.

The server 320 may hold a set of policies that define the allowance of charging time for individual devices 200, individual PAPs 100 or combinations thereof, and is configured to determine and send signals to switch PAPs 100 on when proper allowances are present, as well as send signals to turn the PAPs 100 off when the allowance ends or is not present.

Power Access Point (PAP)

Figure 1B:
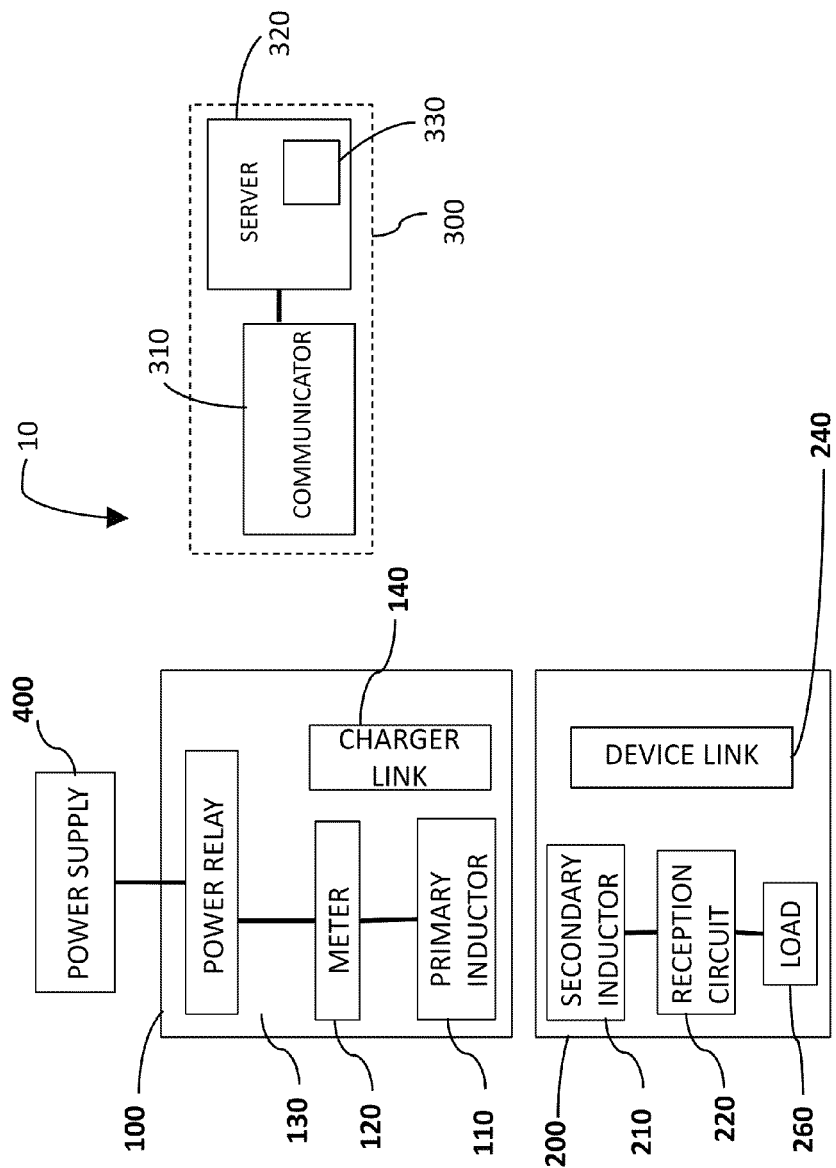
FIG. 1B is a block diagram representing further details of the components of the inductive charging system.

Referring now to FIG. 1B, the power access point (PAP) 100 may include the following: An inductive power transmitter 110, a power meter 120, a power relay 130 and a charger link 140. The PAP may, alternatively, be referred to as a hotspot (HS).

The primary inductor 110 is capable of inductively coupling with a secondary inductor 210. The primary inductor 110 and the PAP 100 more generally, may be capable of charging devices at one or more wattages, e.g. about 5 W, about 10 W, about 40 W or about 65 W, or any combination thereof. The system may be capable of identifying the power requirements of the device 200 being charged, and to appropriately switch the between different wattages according to the device 200. Furthermore, a PAP may be operable to power devices with higher power requirements of say 100 watts, 200 watts, 300 watts, 400 watts, 500 watts, or more, perhaps 1 to 2 kilowatts where required to power directly a device, such as a computer, television, projector, kitchen appliance or the like.

The power meter 120 is connected to the primary inductor and the power relay 120, and is capable of measuring the amount of electrical energy being supplied to, and consumed by, the primary inductor 110. The power meter 120 may, alternatively or in addition, be capable of measuring the amount of time the primary inductor 110 is receiving power. The power meter 120 may further be capable of communicating with the power controller 300 to provide metering information (e.g., amount of electrical energy, power and/or time of charging provided to the primary inductor) to the power controller 300. This communication may be done directly, with the power meter 120 being enabled for wireless communication. Alternatively, the power meter 120 may be wired to a separate wireless communication component associated with the PAP 100. For example, the power meter may be wired to the charger link 140, which may be configured to wirelessly communicate with the power controller 300. As a further alternative, the power meter 120 may be wired to a separate wireless communication component (not shown) that is configured to communicate with the power controller 300.

The power relay 130 may be connected to the power meter 120 and the power supply 400. Further, the power relay 130 may be capable of toggling between an ON and OFF state, such that the power supply 400 is capable of providing power to the primary inductor 110 when the power relay 130 is in the ON state and the power supply 400 is disconnected from the primary inductor 110 when the power relay 130 is in the OFF state. The power relay 130 may further be capable of communicating with the power controller 300, e.g., to receive instructions for being in the ON or OFF state. This communication may be done directly, with the power relay 130 being enabled for wireless communication. Alternatively, the power relay 130 may be wired to a separate wireless communication component within the PAP 100, e.g., the charger link 140 that may be configured to wirelessly communicate with the power controller 300 or a separate wireless communication component (not shown).

The charger link 140 may be capable of sending and/or receiving wireless data. For example, the charger link 140 may be capable of a sending a PAP credential PC to a device link 240 in the device 200. Alternatively on in addition, the charger link 140 may be capable of receiving a device credential DC from the device link 240. The charger link 140 may further be capable of communicating with the power controller 300, for example, to provide the PAP credential PC, as well as relaying the device credential DC.

In addition, the charger link 140 may be wired to other components within the PAP, e.g., the power relay 130, the power meter 120, the primary inductor 110 or others, and wirelessly transmit and/or receive information with the power controller 300 regarding those components.

Device

The device 200 may include may include the following: A secondary inductor 210, a reception circuit 220, a device link 240 and a load 260. The device may further include a screen 250.

The secondary inductor 210 may be capable of inductively coupling with a primary inductor 110.

The device link 240 may be capable of sending and/or receiving wireless data. For example, the device link 240 may be capable of a sending a device credential DC to the charger link 140 in the PAP 100. Alternatively or in addition, the device link 240 may be capable of receiving a PAP credential from the charger link 140. The device link 240 may further be capable of communicating with the power controller 300, for example, to provide the device credential DC, as well as relaying the PAP credential. In addition, the device link 240 may be wired to other components within the device 200, such as the secondary inductor 210, the reception circuit 220, the load 260 or others, and wirelessly transmit and/or receive information with the power controller 300 regarding those components.

Various information may be exchanged between the device link 240 and the charger link 140, e.g., the proximity of the device 200 to the PAP 100, the presence of the electric load; location of the primary inductive coil; location of the secondary inductive coil; required operating voltage for the electric load; required operating current for the electric load; required operating temperature for the electric load; required operating power for the electric load; measured operating voltage for the electric load; measured operating current for the electric load; measured operating temperature for the electric load; measured operating power for the electric load; power delivered to the primary inductive coil; power received by the secondary inductive coil, the level of charge of the load, and a user identification code.

Credentials

A particular PAP 100 may be assigned a unique PAP credential PC, and each device 200 is assigned a unique device credential DC. Alternatively, the device credential DC may be assigned to particular user, such that each device 200 may have multiple device credentials assigned to various users of the device 200 and, conversely, a device credential may be present in multiple devices 200 in the case a user has multiple devices 200.

Power Controller and Authentication

The power controller 300 is capable of receiving a PAP credential PC from a PAP 100 (directly or indirectly) and a device credential DC from a device 200 (directly or indirectly). The power controller 300 may comprise a communicator 310 (which may be referred to as a "gateway") and a server 320 having a central database 330. The server 320 may be a cloud-based server. The communicator 310 may be connected to the server through an Ethernet connection and the like. The communicator 310 may be configured to wireless communicate with the PAP 100 and/or the device 200, to send and receive information such as PAP credentials PC and device credentials DC, as well as subscription and other information relevant to initiating the inductive charging of the device 200 by the PAP 100. The power controller 300 may further be configured to send control signals, e.g., an initiation signal IS and a termination signal TS to the PAP 100 to control its function (directly or indirectly via the device 200). In certain embodiments the PAP 100 may be configured to connect directly with the server 320.

The power controller 300 controls the initiation and maintenance of the charging of the device 200 by the PAP 100. Aside from the appropriate alignment of the device 200 and PAP 100 such that primary inductor 110 and the secondary inductor are capable of inductive coupling, the PAP 100 further requires the reception of an initiation signal IS originating from the power controller.

The central database 330 may include a record of all PAP credentials PC of PAPs 100 that is included in the inductive charging system 10, as well as device credentials DC of devices 200 that may receive inductive charge from a PAP 100. Each PAP credential PC may be associated with ancillary information, for example: store promotions, free charging times (e.g., free charging for 1 minute or free charging during authentication), device manufacturer permissions, the wattage levels of power transfer allowed, charging rates and the like. Each device credential DC may be associated with ancillary information, for example: promotions, the wattage levels of power transfer allowed, personalized charging rates, charging credits, and the like. A user may purchase charging credits in the form of, for example, a pre-paid plan, a monthly plan, and the like. In addition, ancillary information may be associated with particular pairings of a PAP credential PC and a device credential DC, for example, the wattage levels of power transfer allowed or a promotion directed to an individual user provided by a particular store where a particular PAP is located.

Once the power controller 300 is queried with a power request with a particular pairing of a device credential DC and a PAP credential PC, it makes a determination based on the information stored in the database 330 whether or not a charging allotment exists for the particular device credential DC in combination with the particular PAP credential. If there is, the power controller 300 returns an initiation signal IS to activate the PAP 100 associated with the PAP credential PC (by, e.g., connecting the primary inductor 110 with the power supply 400). The power controller 300 may be configured to send a termination signal TS to the PAP after a pre-determined period of time. Alternatively or in combination, the power controller 300 may receive metering data MD from the power meter 120 (directly if the power meter is capable of wireless communication, or indirectly through a wireless communication component of the PAP 100 or through the device 200), and initiate a termination signal TS once the metering data MD indicates that the charge allocation or charge time has been used up.

In addition to the pairing of the device credential DC and the PAP credential PC, the co-localization of a PAP 100 and a device 200 may be confirmed by a random (or pseudorandom) code. After a device 200 is placed near a PAP 100, the PAP 100 may transmit a random (or pseudorandom) code to the device 200, which then relays the code to the power controller 300. In addition, the PAP 100 may transmit the same code to the power controller 300. Once the power controller 300 receives the code from the PAP 100 as well as the device 200, co-localization of the PAP 100 and the device 200 is confirmed.

The communication between a PAP 100, a power controller 300 and a device 200 may be wireless. The wireless communication may be enabled by wireless communication components, for example, the charger link 140 in the PAP 100, the device link 240 in the device 200, and the communicator 310 in the power controller 300. Each of the charger link 140, the device link 240 and the communicator 310 may include multiple individual wireless communication modules or components for using different wireless communication modalities. For example, the charger link 140 and the device link 240 may communicate through a first modality, while the charger link 140 and the device link 240 may communicate with the communicator 310 using a second modality. Alternatively, the charger link 140 and the device link 240 may communicate through a first modality, the charger link 140 may communicate with the communicator 310 using a second modality, and the device link 240 may communicate with the communicator 310 using a third modality. The wireless communication modalities may include, for example, a wireless local area network (WLAN) such as WiFi, Zigbee, Z-wave, 6LowPAN and the like or a mobile data network such as 2G, 3G, 4G, and the like. The modality of wireless communication, in particular between a PAP 100 and a device 200 may, in addition to the long range methods above, may be mediated by a close communication module incorporated in the charger link 140 an the device link 240, which may be, e.g., Near Field Communication (NFC), RFID (tag and/or receiver), optical signals (emitter and/or receiver), sound signals (and/or receiver), or data encoded in the inductive coupling between the primary inductor 110 and the secondary inductor 120. In certain embodiments, the PAP 100 may be configured to connect with the communicator 310, or directly to the server 320, through a wired connection, such as an Ethernet connection. Each of the charger link 140 and the device link 240 may be operable for one-way communication or for two-way communication, depending on the arrangement of the inductive charging system, as described in further detail herein. For example, in an arrangement having a one-way communication from the device link 240 to the charger link 140, the device link 240 may comprise an RFID tag and the charger link 140 may comprise an RFID reader.

Arrangement of the Inductive Charging System

Figure 2:
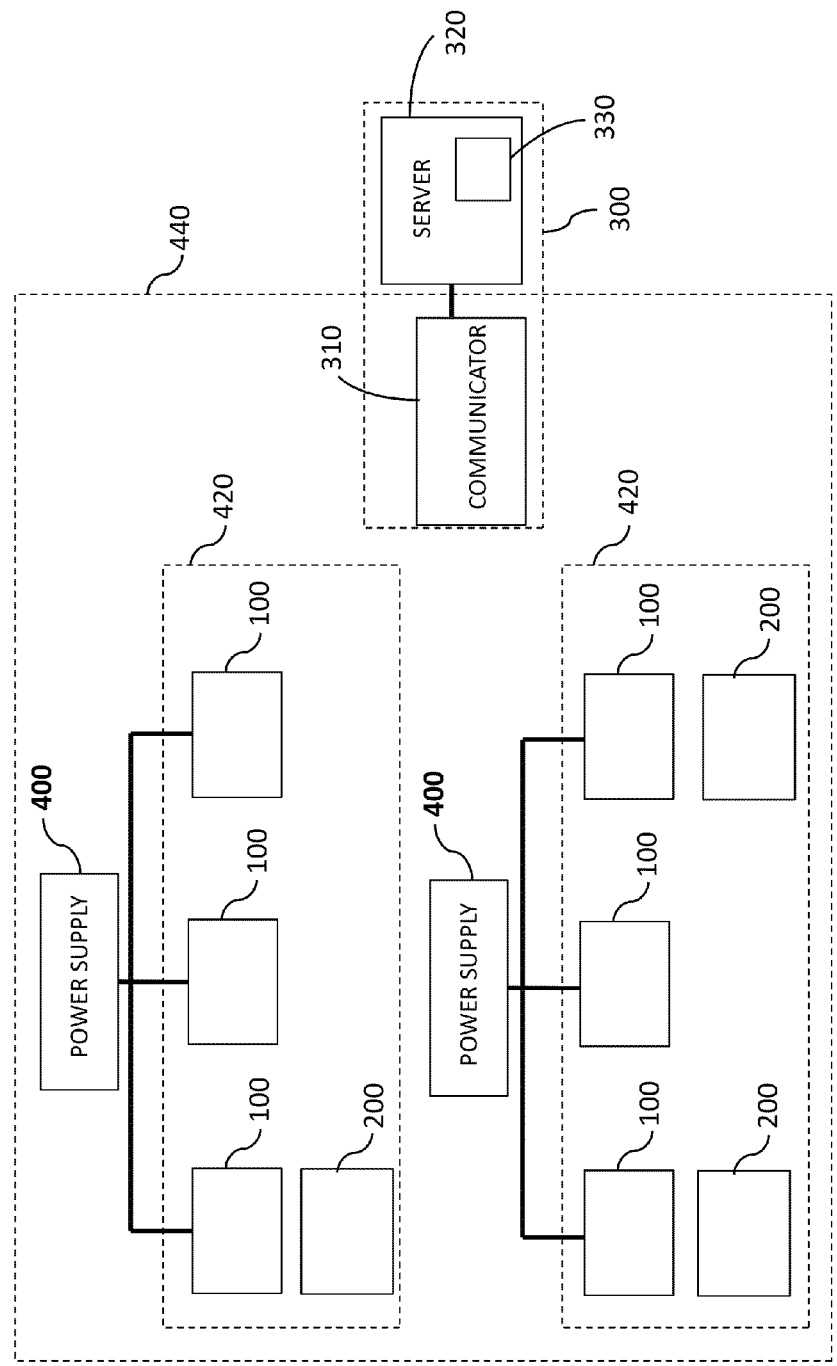
FIG. 2 is a block diagram representing the arrangement of the inductive charging system.

With reference to FIG. 2, the disclosure provides for a charging surface 420 comprising a plurality of PAPs 100. Multiple PAPs 100 may be connected to a power supply 400. A power supply 400 may be operable to provide power to six or more PAPs 100. Alternatively, each PAP may be connected to a separate power supply (not shown). The charging surface may be, e.g., a table or a counter. The charging surface 420 may be arranged parallel to the ground, such that a device 200 may be placed on top of a PAP 100. The PAP 100 and the device 200 may be configured such that they may be inductively coupled when the device 200 is placed on top of the PAP 100. For example, the inductive charging may be effective when the distance between the primary inductor in the PAP 100 and the secondary inductor in the device 200 are at a distance of up to 10 millimeters. The area of the PAP 100 that is effective for inductive charging may be, for example, a circular area with a radius of 12 millimeters.

Each PAP may be structurally integrated into the charging surface 420. The PAPs 100 may appear as a distinct device inserted within an indentation prepared in the charging surface 420. Alternatively, the PAPs 100 may be covered by the top portion of the charging surface 420, with a visual mark denoting the locations of each PAP 100 underneath.

The power controller 300 is typically separate from the charging surface 420 and is configured to communicate wirelessly with the PAP 100, the device 200, or both. Further, the communicator 310 may be configured to communicate with multiple charging surfaces. Typically, a service location 440 includes at least one communicator 310 and at least one charging surface 420, which comprises at least one PAP 100. Alternatively, the communicator 310 may be outside of the service location 440.

The communicator 310 is typically not installed behind metallic walls (in relation to the PAPs 100), inside metallic cabinet or in low locations. Further, the communicator 310 may be operable to communicate with a PAP placed thirty meters or more away, and through one or two (non-metallic) walls. The total site radius, the distance from the communicator 310 to the farthest PAP 100 may be a hundred meters. The communicator 310 may be operable to support communication for, say, up to fifty PAPs 100 or more than fifty PAPs 100.

The inductive charging system may include multiple service locations 440, each including at least one communicator 310 and at least one charging surface 420, which comprises at least one PAP 100. The server 320 may be configured to be connected to multiple communicators 310, for example, via the internet, or an Ethernet connection. Typically, the server 320 is not located with a service location 440. The service location may be, for example, restaurants, coffee shops, airport lounges, trains, buses, taxis, sports stadia, auditoria, theatres, cinemas or the like.

The portion of each PAP 100 that is visible or section of the charging surface 420 covering a PAP 100 may be marked by a unique serial number identifying the PAP. The serial number may be a number unique to all the PAPs in service and connectable to the central database of the power controller 300.

Charging Initiation and Maintenance Procedures

The disclosure encompasses various procedures for the inductive charging system to initiate and maintain (or terminate) inductive charging between a PAP 100 and a device 200, through a power controller 300, as described below.

Credential Transfer: PAP to Device

Figure 3A:
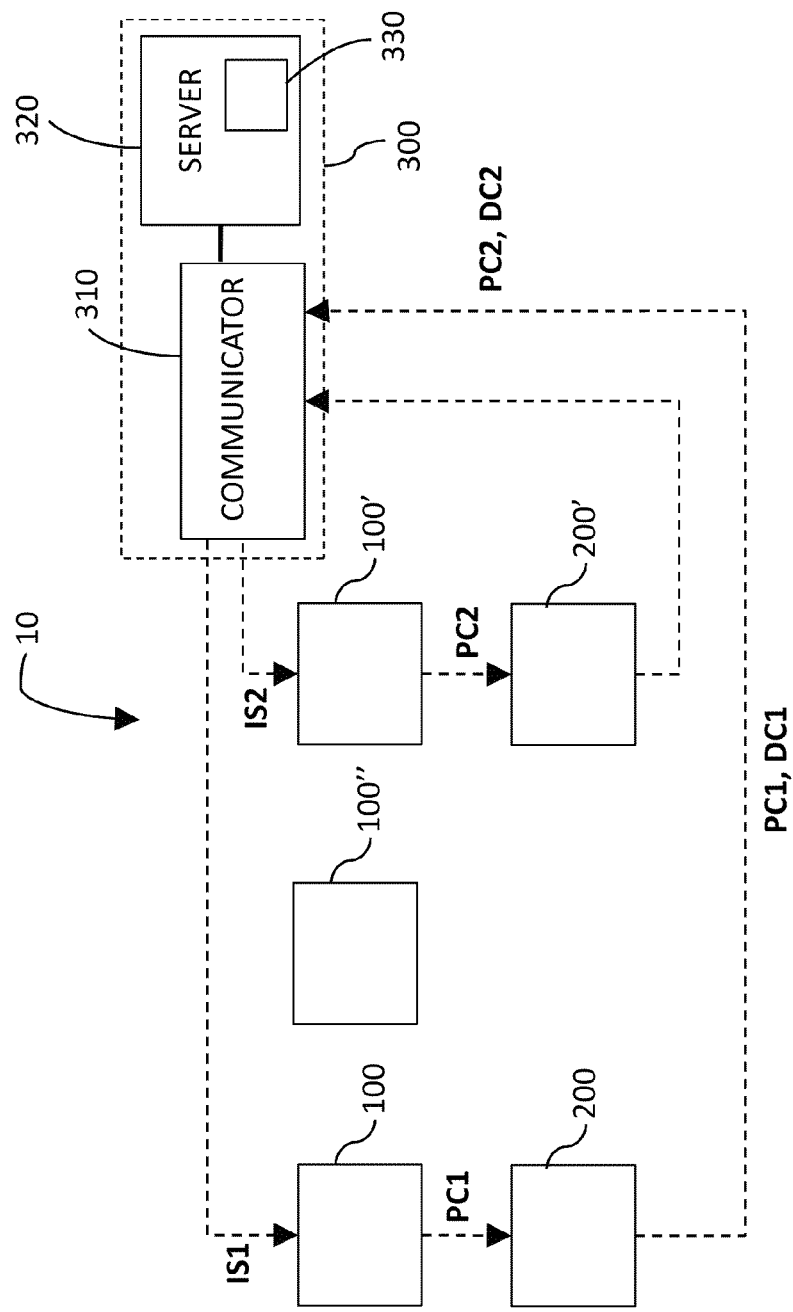
FIGS. 3A-B are block diagrams representing an inductive charging system and a possible procedure for initiation and maintaining/termination of inductive charging.

With reference to FIG. 3A, the activation of PAP 100 for charging the device 200 may include a series of wireless information transfers. The user may begin the remote charging initiation procedure by, for example, putting the device 200 in close proximity to the PAP 100, instructing the device 200 to begin the charging initiation procedure (by, e.g., opening an app or a website) or pressing a switch on the PAP 100. Once the charging initiation process is begun, the PAP 100 wirelessly transmits its unique PAP credential PC1 to the device 200. The device 200 then wirelessly transmits the received PAP credential PC1, together with its device credential DC1, to the power controller 300 (for example, to the communicator 310). The server 320 then determines a charging allocation for the received PAP credential/device credential pair based on the ancillary information associated to the PAP credential PC1 and the device credential DC1, as stored in the database 330. If the charging allocation is greater than null, the power controller 300 (for example, via the communicator 310) wirelessly transmits an initiation signal IS1 to the PAP 100, thus activating the PAP 100, e.g., by connecting the power supply to the primary inductor contained within the PAP 100. Other PAPs and devices may operate in parallel. For example, the PAP 100' may present its unique PAP credential DC2 to the device 200', which then transmits the PAP credential PC2 and its device credential DC2 to the power controller 300, which, upon the determination of a charging allocation, transmits another initiation signal IS2 to PAP 100', thus activating it.

Figure 3B:
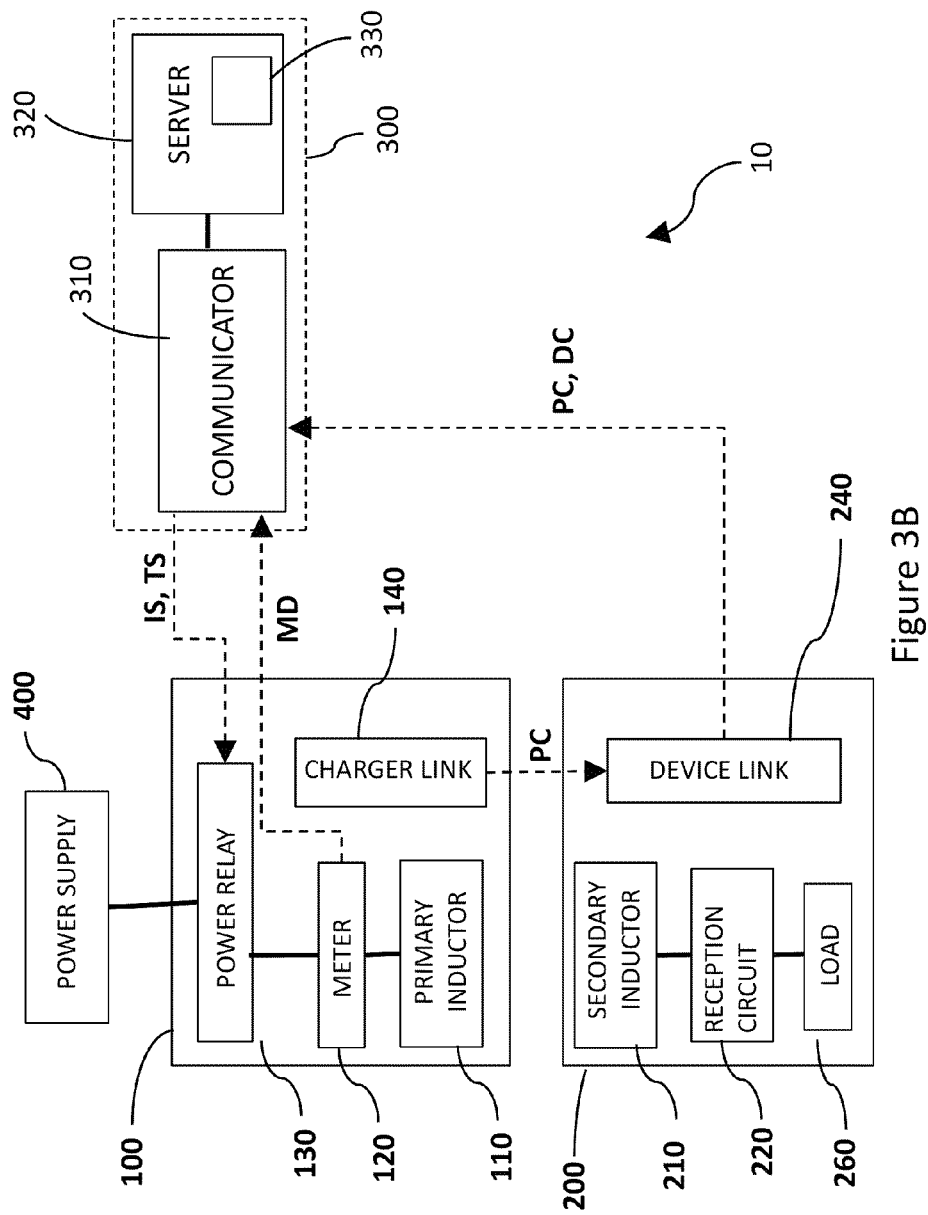

Reference is now made to FIG. 3B. Upon the user beginning the remote charging initiation procedure, the charger link 140 in the PAP transmits the PAP credential PC to the device link 240 in the device 200. The charger link 140, as well as the device link 240, may each comprise a transceiver for a WLAN such as WiFi, Zigbee, Z-wave, 6LowPAN and the like. Alternatively, the charger link 140, as well as the device link 240, may each comprise a transceiver for a mobile data network such as 2G, 3G, 4G and the like. Alternatively, the charger link 140 may comprise an NFC tag and the device link 240 may comprise an NFC reader. Alternatively, the charger link 140 may comprise an RFID tag and the device link 240 may comprise an RFID reader. Alternatively, the charger link 140 may comprise an optical signal transmitter and the device link 240 may comprise an optical detector. Alternatively, the charger link 140 may comprise a sound generator, e.g., a speaker, and the device link 240 may comprise a sound detector, e.g., a microphone. Alternatively, the PAP credential PC and other data may be encoded within a magnetic field generated by the primary inductor 110 and converted into an induced current in the device 200 by the secondary inductor 210.

Upon receiving the PAP credential PC, the device 200 may transmit wirelessly the PAP credential PC and its device credential DC to the power controller, e.g., to the communicator 310. The device link 240, as well as the communicator 310, may each comprise a transceiver for a WLAN such as WiFi, Zigbee, Z-wave, 6LowPAN and the like. Alternatively, the device link 240 as well as the communicator 310 may each comprise a transceiver for a mobile data network such as 2G, 3G, 4G and the like.

Once the power controller 300 is queried with a power request with a particular pairing of a device credential DC and a PAP credential PC, it makes a determination based on the information stored in the database 330 whether or not a charging allotment exists for the particular device credential DC in combination with the particular PAP credential. If there is, the power controller 300 wirelessly transmits an initiation signal IS to the PAP 100 associated with the PAP credential PC that activates the PAP 100 (by, e.g., connecting the primary inductor 110 with the power supply 400). The initiation signal IS may be received by a power relay 130 that is enabled for wireless communication. The power relay 130 may comprise a transceiver for a WLAN such as WiFi, Zigbee, Z-wave, 6LowPAN and the like, or a transceiver for a mobile data network such as 2G, 3G, 4G and the like. Alternatively, the power relay 130 may not be enabled for wireless communication, and instead be wired to the charger link 140, which receives the initiation signal IS.

Once the PAP 100 is activated, the power meter 120 may provide the metering data MD wirelessly (directly if wirelessenabled or indirectly through the charger link 140) to the power controller 300 at timed intervals (e.g., every 10 seconds, every 30 seconds, every minute, or the like). The server compares the metering data MD to the charging allocation. Once the metering data MD reaches or exceeds the charging allocation the power controller 300 may transmit a termination signal TS wirelessly to the power relay 130, which disengages the PAP 100, e.g., by the power relay 130 disconnecting the primary inductor 110 from the power supply 400. The power meter 120 may comprise a transceiver for a WLAN such as WiFi, Zigbee, Z-wave, 6LowPAN and the like, or a transceiver for a mobile data network such as 2G, 3G, 4G and the like. Alternatively, the power meter 120 may not be enabled for wireless communication, and instead be wired to the charger link 140, which transmits the metering data MD. Alternatively or in addition, the device 200 may transmit to the power controller 300 the level of charge of the load 260. The charging allocation determined by the server may be, e.g., an allowance to receive a full charge, or an allowance to receive a partial charge, the reception of a predetermined level of power by the load 260, or the like.

Manual PAP Credential Entry

Figure 4A:
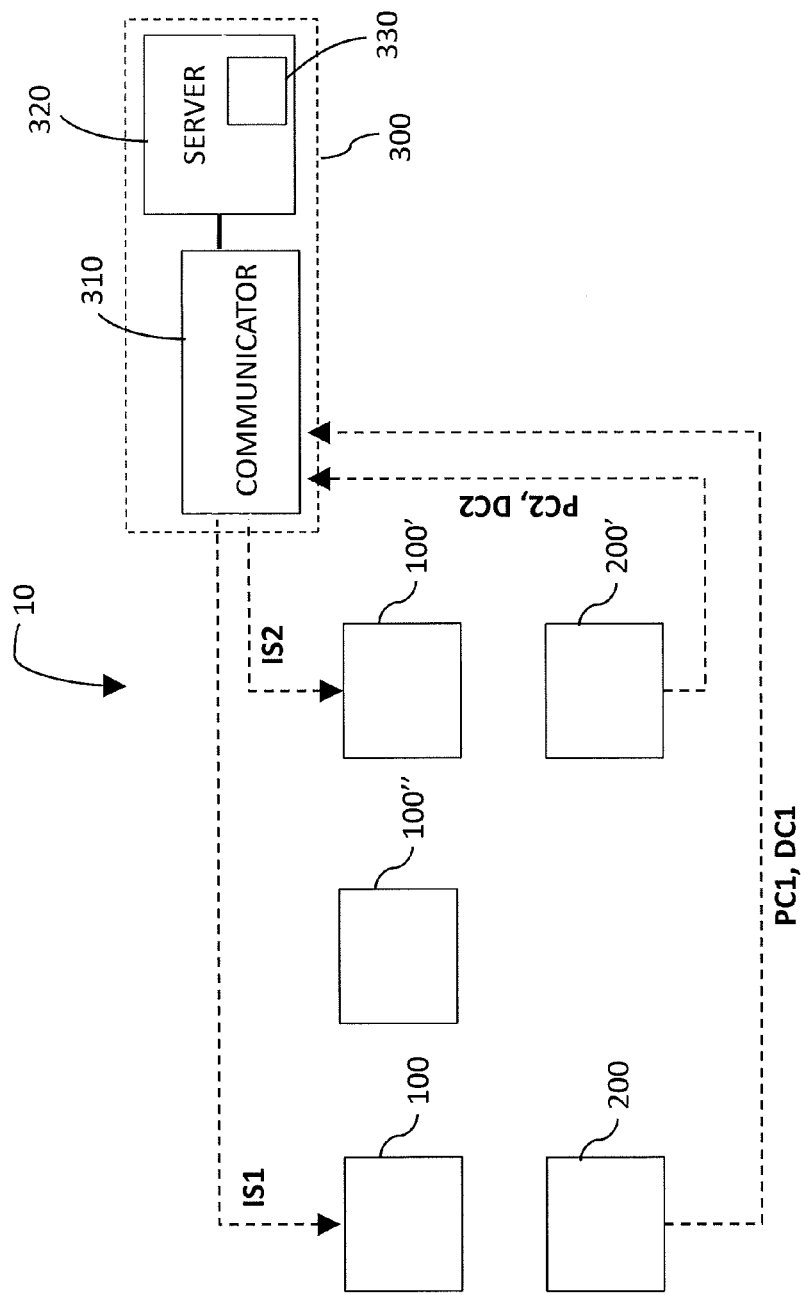
FIGS. 4A-B are block diagrams representing an inductive charging system and another possible procedure for initiation and maintaining/termination of inductive charging.

With reference to FIG. 4A, the activation of PAP 100 for charging the device 200 may be initiated by a manual entry of the PAP credential PC into the device 200 followed by a series of wireless information transfers. The user may begin the remote charging initiation procedure by entering the PAP credential PC of the desired PAP 100 into the device 200. The PAP credential may be a code written on or near each PAP 100, or may be encoded in an image that the user captures with an image capture device incorporated within the device 200 (e.g., a built-in camera). Once the user enters the PAP credential PC into the device 200, the device 200 wirelessly transmits the received PAP credential PC1, together with its device credential DC1, to the power controller 300 (for example, to the communicator 310). The server 320 then determines a charging allocation for the received PAP credential/device credential pair based on the ancillary information associated to the PAP credential PC1 and the device credential DC1, as stored in the database 330. If the charging allocation is greater than null, the power controller 300 (for example, via the communicator 310) wirelessly transmits an initiation signal IS1 to the PAP 100, thus activating the PAP 100, e.g., by connecting the power supply to the primary inductor contained within the PAP 100. Other PAPs and devices may operate in parallel. For example, the user may enter a PAP credential PC2 to the device 200', which then transmits the entered PAP credential PC2 and its device credential DC2 to the power controller 300, which, upon the determination of a charging allocation, transmits another initiation signal IS2 to PAP 100', thus activating it.

Figure 4B:
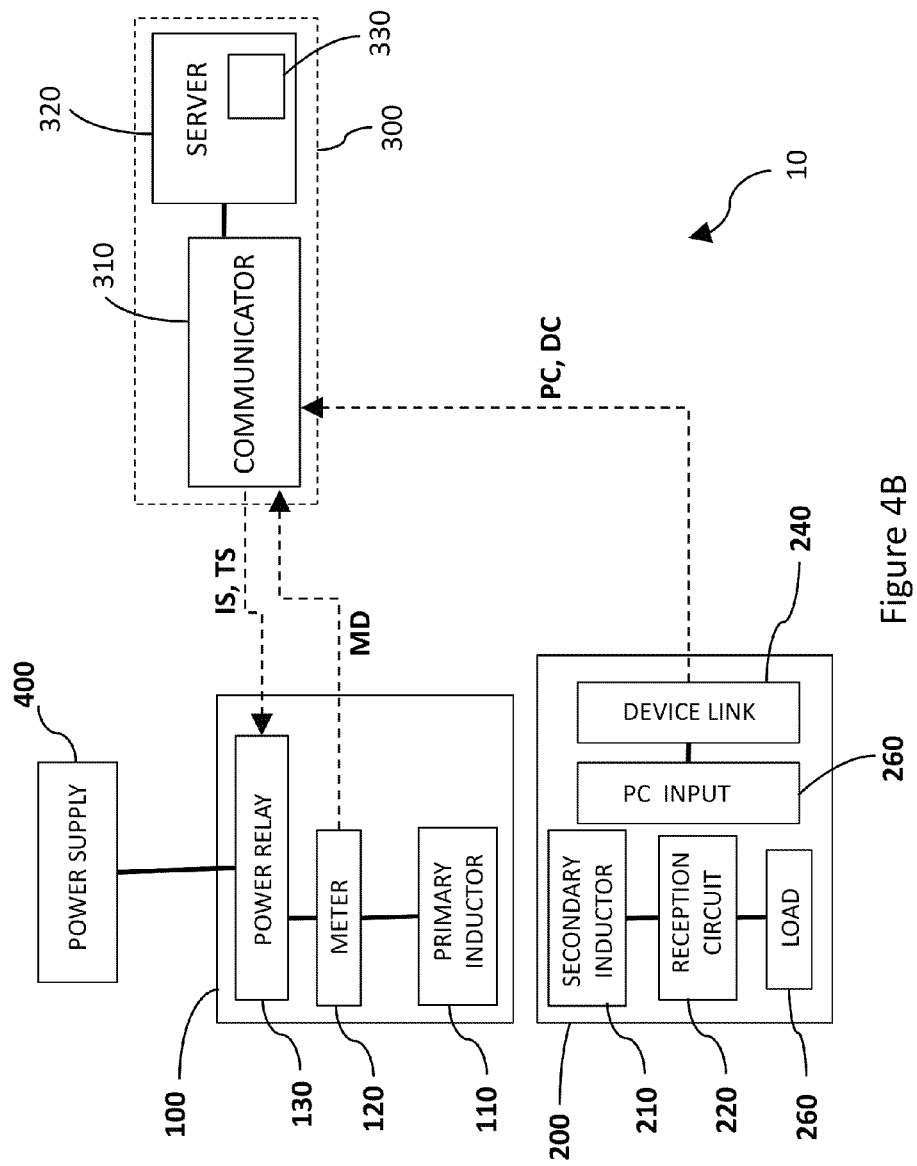

Reference is now made to FIG. 4B. The user begins the remote charging initiation procedure by entering the PAP credential PC via a PAP credential (PC) input 260. The PC input may be the manual entry of the PAP credential via a keyboard or the capturing of an image encoding the PAP credential PC via a built-in camera. The PC input is wired to a device link 240. The device link 240 may comprise a transceiver for a WLAN such as WiFi, Zigbee, Z-wave, 6LowPAN and the like, or a transceiver for a mobile data network such as 2G, 3G, 4G and the like. Upon receiving the PAP credential PC, the device 200 may transmit wirelessly the PAP credential PC and its device credential DC to the power controller 300, e.g., to the communicator 310.

Once the power controller 300 is queried with a power request with a particular pairing of a device credential DC and a PAP credential PC, it makes a determination based on the information stored in the database 330 whether or not a charging allotment exists for the particular device credential DC in combination with the particular PAP credential. If there is, the power controller 300 wirelessly transmits an initiation signal IS to the PAP 100 associated with the PAP credential PC that activates the PAP 100 (for example by connecting the primary inductor 110 with the power supply 400). The initiation signal IS may be received by a power relay 130 that is enabled for wireless communication. The power relay 130 may comprise a transceiver for a WLAN such as WiFi, Zigbee, Z-wave, 6LowPAN and the like, or a transceiver for a mobile data network such as 2G, 3G, 4G and the like. Alternatively, the power relay 130 may not be enabled for wireless communication, and instead be wired to the charger link (not shown), which receives the initiation signal IS.

Once the PAP 100 is activated, the power meter 120 provides the metering data MD wirelessly (directly if wireless-enabled or indirectly through the charger link 140) to the power controller 300 at timed intervals (e.g., every 10 seconds, every 30 seconds, every minute, or the like). The server compares the metering data MD to the charging allocation. Once the metering data MD reaches or exceeds the charging allocation the power controller 300 may transmit a termination signal TS wirelessly to the power relay 130, which disengages the PAP 100, e.g., by the power relay 130 disconnecting the primary inductor 110 from the power supply 400. The power meter 120 may comprise a transceiver for a WLAN such as WiFi, Zigbee, Z-wave, 6LowPAN and the like, or a transceiver for a mobile data network such as 2G, 3G, 4G and the like. Alternatively, the power meter 120 may not be enabled for wireless communication, and instead be wired to a charger link (not shown), which transmits the metering data MD. Alternatively or in addition, the device 200 may transmit to the power controller 300 the level of charge of the load 260. The charging allocation determined by the server may be, e.g., an allowance to receive a full charge, or an allowance to receive a partial charge, the reception of a predetermined level of power by the load 260, or the like.

Credential Transfer: Device to PAP

Figure 5A:
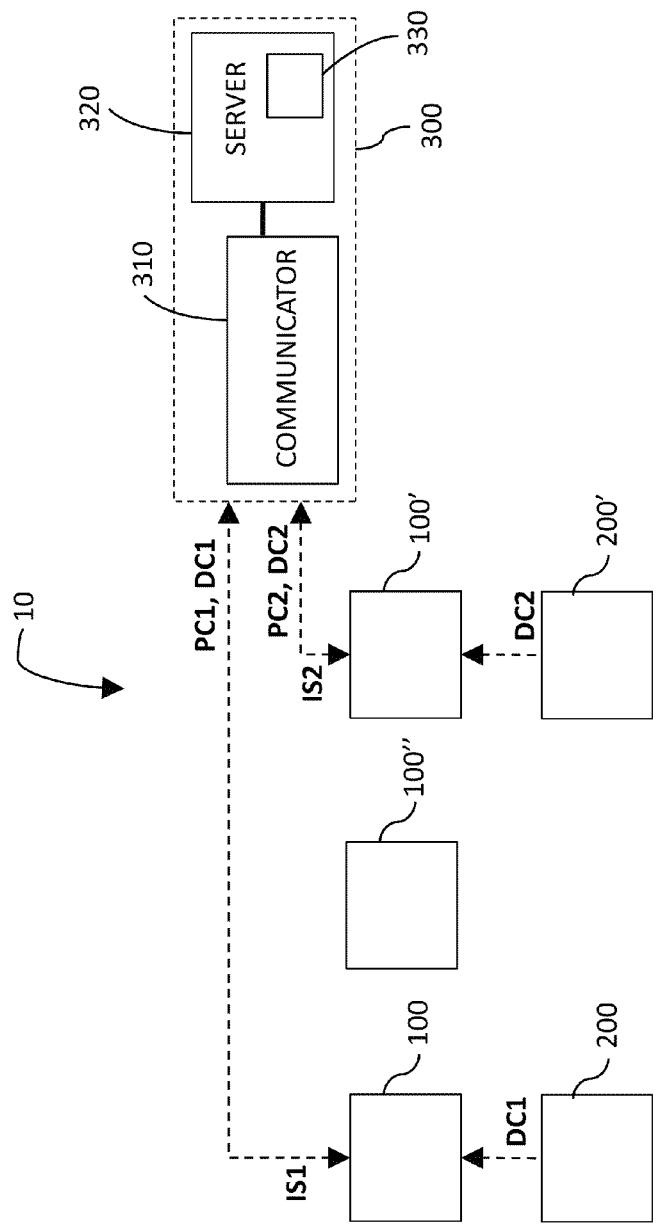
FIGS. 5A-B are block diagrams representing an inductive charging system and another possible procedure for initiation and maintaining/termination of inductive charging.

With reference to FIG. 5A, the activation of PAP 100 for charging the device 200 may include a series of wireless information transfers. The user may begin the remote charging initiation procedure by, for example, putting the device 200 in close proximity to the PAP 100, instructing the device 200 to begin the charging initiation procedure (by, e.g., opening an app or a website) or pressing a switch on the PAP 100. Once the charging initiation process is begun, the device 200 wirelessly transmits its unique device credential DC1 to the PAP 100. The PAP 100 then wirelessly transmits its PAP credential PC1, together with the received device credential DC1, to the power controller 300 (for example, to the communicator 310). The server 320 then determines a charging allocation for the received PAP credential/device credential pair based on the ancillary information associated to the PAP credential PC1 and the device credential DC1, as stored in the database 330. If the charging allocation is greater than null, the power controller 300 (for example, via the communicator 310) wirelessly transmits an initiation signal IS1 to the PAP 100, thus activating the PAP 100, e.g., by connecting the power supply to the primary inductor contained within the PAP 100. Other PAPs and devices may operate in parallel. For example, the device 200' may present its unique device credential DC2 to the PAP 100', which then transmits its PAP credential PC2 and the received device credential DC2 to the power controller 300, which, upon the determination of a charging allocation, transmits another initiation signal IS2 to PAP 100', thus activating it.

Figure 5B:
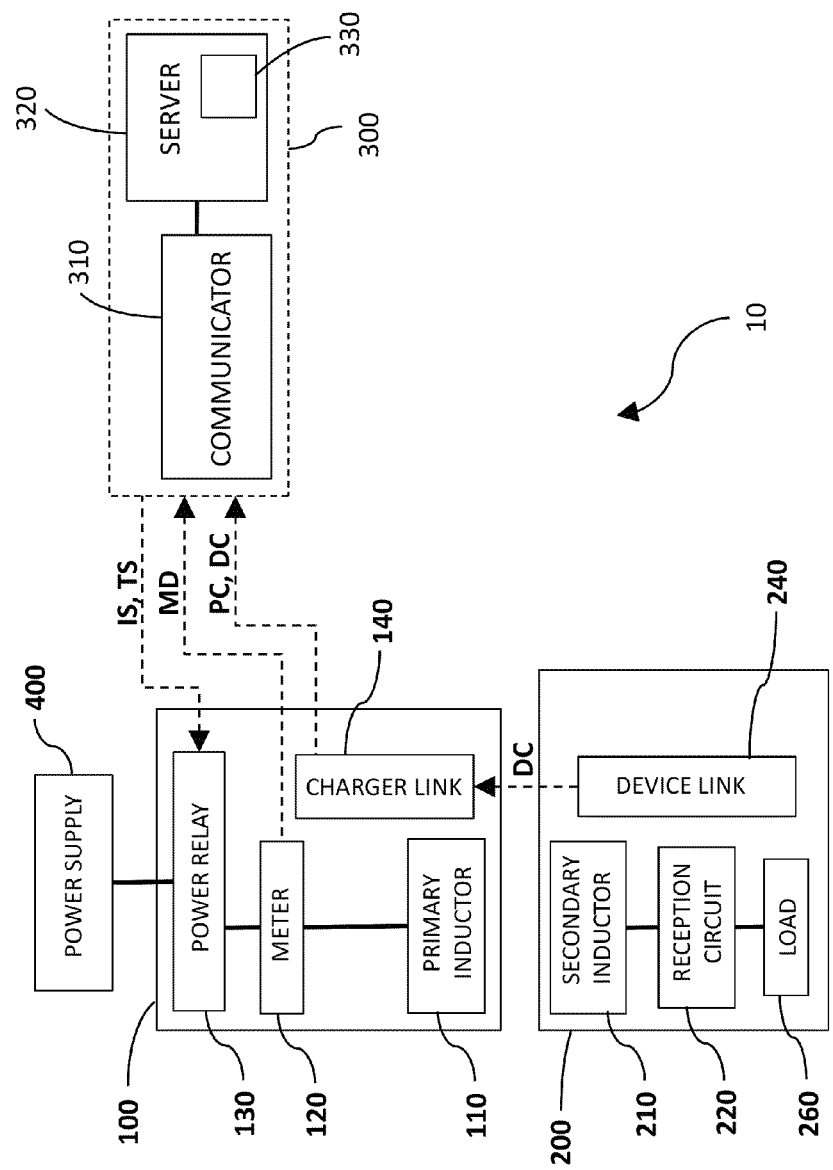

Reference is now made to FIG. 5B. Upon the user beginning the remote charging initiation procedure, the device link 240 in the PAP transmits the device credential DC to the charger link 140 in the PAP 100. The charger link 140, as well as the device link 240, may each comprise a transceiver for a WLAN such as WiFi, Zigbee, Z-wave, 6LowPAN and the like. Alternatively, the charger link 140, as well as the device link 240, may each comprise a transceiver for a mobile data network such as 2G, 3G, 4G and the like. Alternatively, the charger link 140 may comprise an NFC reader and the device link 240 may comprise an NFC tag. Alternatively, the charger link 140 may comprise an RFID reader and the device link 240 may comprise an RFID tag. Alternatively, the charger link 140 may comprise an optical detector and the device link 240 may comprise an optical signal transmitter. Alternatively, the charger link 140 may comprise a sound detector, e.g., a microphone, and the device link 240 may comprise a sound generator, e.g., a speaker. Alternatively, the device credential DC and other data may be encoded within a pattern of load changes in the device, e.g., generated by the reception circuit 220 or varying the level of screen illumination, which is then detected by the PAP 100 through changes in the current passing through the primary inductor 110.

Upon receiving the device credential DC, the PAP 100 may transmit wirelessly its PAP credential PC and the device credential DC to the power controller, e.g., to the communicator 310. The charger link 140, as well as the communicator 310, may each comprise a transceiver for a WLAN such as WiFi, Zigbee, Z-wave, 6LowPAN and the like. Alternatively, the charger link 140 as well as the communicator 310 may each comprise a transceiver for a mobile data network such as 2G, 3G, 4G and the like.

Once the power controller 300 is queried with a power request with a particular pairing of a device credential DC and a PAP credential PC, it makes a determination based on the information stored in the database 330 whether or not a charging allotment exists for the particular device credential DC in combination with the particular PAP credential. If there is, the power controller 300 wirelessly transmits an initiation signal IS to the PAP 100 associated with the PAP credential PC that activates the PAP 100 (by, e.g., connecting the primary inductor 110 with the power supply 400). The initiation signal IS may be received by a power relay 130 that is enabled for wireless communication. The power relay 130 may comprise a transceiver for a WLAN such as WiFi, Zigbee, Z-wave, 6LowPAN and the like, or a transceiver for a mobile data network such as 2G, 3G, 4G and the like. Alternatively, the power relay 130 may not be enabled for wireless communication, and instead be wired to the charger link 140, which receives the initiation signal IS.

Once the PAP 100 is activated, the power meter 120 provides the metering data MD wirelessly (directly if wireless-enabled or indirectly through the charger link 140) to the power controller 300 at timed intervals (e.g., every 10 seconds, every 30 seconds, every minute, or the like). The server 320 compares the metering data MD to the charging allocation. Once the metering data MD reaches or exceeds the charging allocation, the power controller 300 may transmit a termination signal TS wirelessly to the power relay 130, which disengages the PAP 100, e.g., by the power relay 130 disconnecting the primary inductor 110 from the power supply 400. The power meter 120 may comprise a transceiver for a WLAN such as WiFi, Zigbee, Z-wave, 6LowPAN and the like, or a transceiver for a mobile data network such as 2G, 3G, 4G and the like. Alternatively, the power meter 120 may not be enabled for wireless communication, and instead be wired to the charger link 140, which transmits the metering data MD. Alternatively or in addition, the device 200 may transmit to the power controller 300 (via the PAP 100) the level of charge of the load 260. The charging allocation determined by the server may be, e.g., an allowance to receive a full charge, or an allowance to receive a partial charge, the reception of a predetermined level of power by the load 260, or the like.

Device-Mediated Wireless Communication

With reference to FIG. 5A, the activation of PAP 100 for charging the device 200 may include a series of wireless information transfers. The user may begin the remote charging initiation procedure by, for example, putting the device 200 in close proximity to the PAP 100, instructing the device 200 to begin the charging initiation procedure (by, e.g., opening an app or a website) or pressing a switch on the PAP 100. Once the charging initiation process is begun, the device 200 wirelessly transmits its unique device credential DC1 to the PAP 100. The PAP 100 then wireles sly transmits its PAP credential DC1, together with the received device credential DC1, to the power controller 300 (for example, to the communicator 310). The server 320 then determines a charging allocation for the received PAP credential/device credential pair based on the ancillary information associated to the PAP credential DC1 and the device credential DC1, as stored in the database 330. If the charging allocation is greater than null, the power controller 300 (for example, via the communicator 310) wirelessly transmits an initiation signal IS1 to the PAP 100, thus activating the PAP 100, e.g., by connecting the power supply to the primary inductor contained within the PAP 100. Other PAPs and devices may operate in parallel. For example, the device 200' may present its unique device credential DC2 to the PAP 100', which then transmits its PAP credential DC2 and the received device credential DC2 to the power controller 300, which, upon the determination of a charging allocation, transmits another initiation signal IS2 to PAP 100', thus activating it.

Figure 6A:
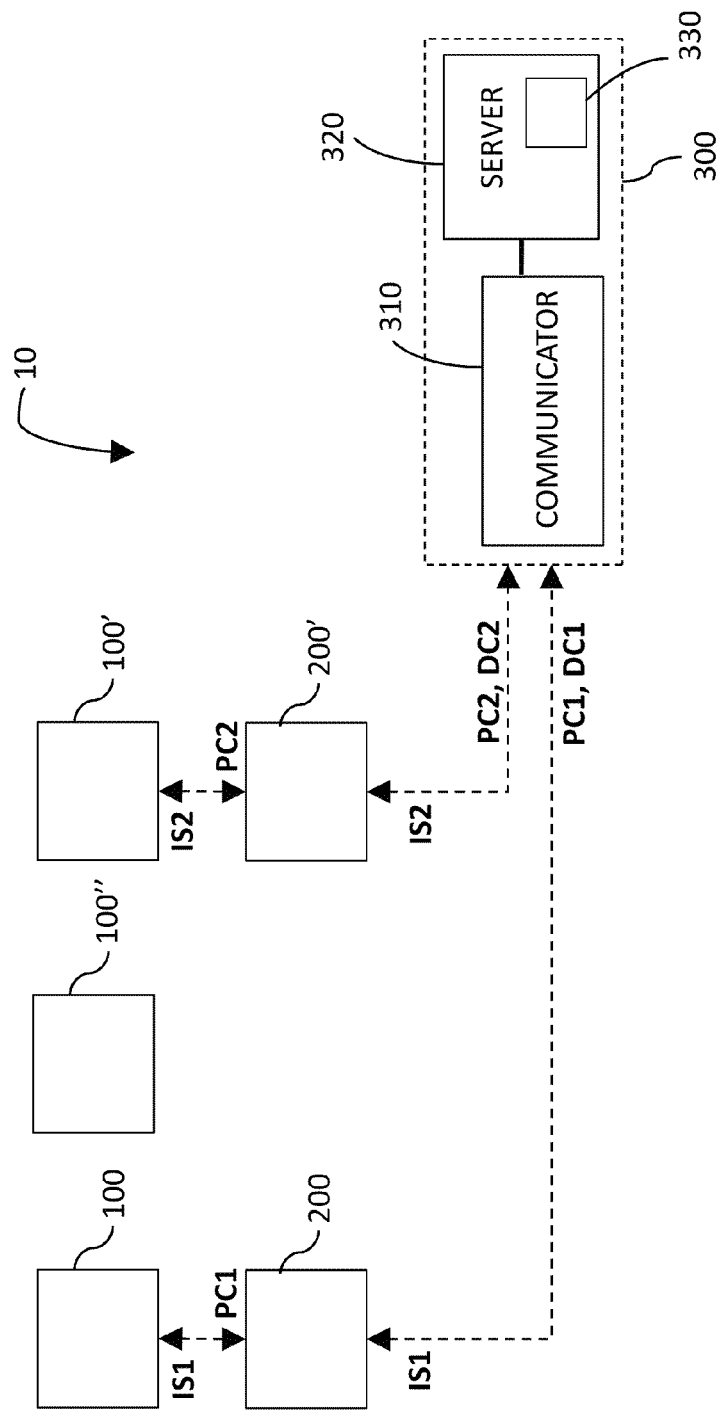
FIGS. 6A-B are block diagrams representing an inductive charging system and another possible procedure for initiation and maintaining/termination of inductive charging.
Figure 6B:
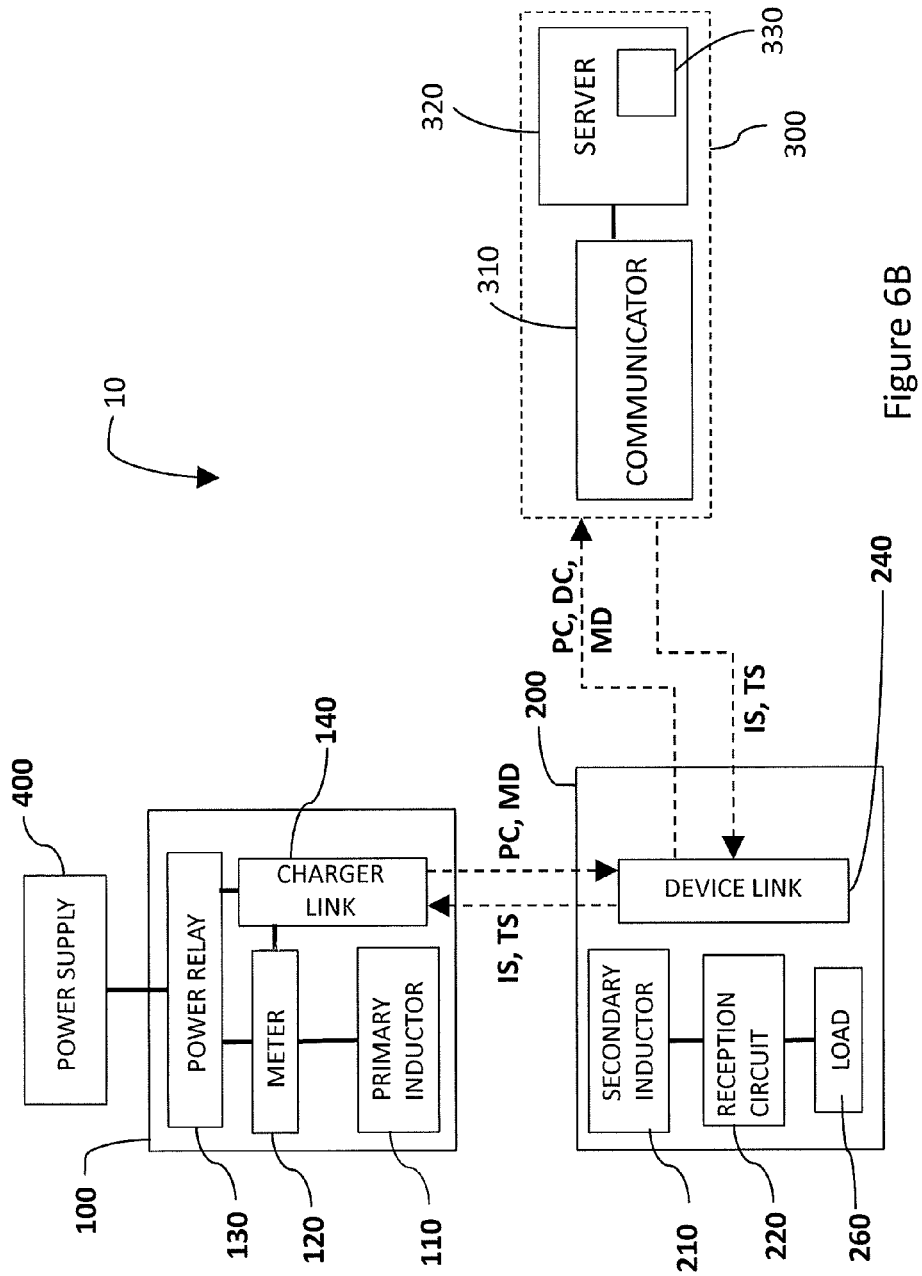

Reference is now made to FIG. 6B. Upon the user beginning the remote charging initiation procedure, the charger link 140 in the PAP transmits the PAP credential PC to the device link 240 in the device 200. The charger link 140, as well as the device link 240, may each comprise a transceiver for a WLAN such as WiFi, Zigbee, Z-wave, 6LowPAN or the like. Alternatively, the charger link 140, as well as the device link 240, may each comprise a transceiver for a mobile data network such as 2G, 3G, 4G and the like.

Near field communication between the PAP 100 and the device 200 may be provided as well. Where the communication with the power controller 300 is primarily (or entirely) mediated by the device 200, it may be desirable for the wireless communication between the PAP 100 and the device 200 to be bi-directional. As such, the charger link 140 and the device link 240 may each comprise an NFC tag as well as an NFC reader. Alternatively, the charger link 140 and the device link 240 may each comprise an RFID tag as well as an RFID reader. Alternatively, the charger link 140 and the device link 240 may each comprise an optical signal transmitter an optical detector. Alternatively, the charger link 140 and the device link 240 may each comprise a sound generator, e.g., a speaker, and a sound detector, e.g., a microphone. Alternatively, the PAP credential PC and other data may be encoded within a magnetic field generated by the primary inductor 110 and converted into an induced current in the device 200 by the secondary inductor 210. In addition, data may be encoded within a pattern of load changes in the device 200, e.g., generated by the reception circuit 220 or varying the level of screen illumination, which is then detected by the PAP 100 through changes in the current passing through the primary inductor 110. Upon receiving the PAP credential PC, the device 200 may transmit wirelessly the PAP credential PC and its device credential DC to the power controller, e.g., to the communicator 310. The device link 240, as well as the communicator 310, may each comprise a transceiver for a WLAN such as WiFi, Zigbee, Z-wave, 6LowPAN and the like. Alternatively, the device link 240 as well as the communicator 310 may each comprise a transceiver for a mobile data network such as 2G, 3G, 4G and the like.

Once the power controller 300 is queried with a power request with a particular pairing of a device credential DC and a PAP credential PC, it makes a determination based on the information stored in the database 330 whether or not a charging allotment exists for the particular device credential DC in combination with the particular PAP credential. If there is, the power controller 300 wirelessly transmits an initiation signal IS to the device link 240, which then transfers the IS to the power relay 130 wired to the charger link 140, thus activating the PAP 100 (by, e.g., connecting the primary inductor 110 with the power supply 400). Alternatively, the initiation signal IS may be received from the device link 240 directly by a power relay 130 that is enabled for wireless communication. The power relay 130 may comprise a transceiver for a WLAN such as WiFi, Zigbee, Z-wave, 6LowPAN and the like, or a transceiver for a mobile data network such as 2G, 3G, 4G and the like.

Once the PAP 100 is activated, the power meter 120 may provide the metering data MD wirelessly (directly if wireless-enabled or indirectly through the charger link 140) to the device link 240 at timed intervals (e.g., every 10 seconds, every 30 seconds, every minute, or the like). The device link may transfer the metering data MD to the power controller 300. The server compares the metering data MD to the charging allocation. Once the metering data MD reaches or exceeds the charging allocation the power controller 300 may transmit a termination signal TS wirelessly to the power relay 130 (indirectly via the device link 240), which disengages the PAP 100, e.g., by the power relay 130 disconnecting the primary inductor 110 from the power supply 400. The power meter 120 may comprise a transceiver for a WLAN such as WiFi, Zigbee, Z-wave, 6LowPAN and the like, or a transceiver for a mobile data network such as 2G, 3G, 4G and the like. Alternatively, the power meter 120 may not be enabled for wireless communication, and instead be wired to the charger link 140, which transmits the metering data MD. Alternatively or in addition, the device 200 may transmit to the power controller 300 the level of charge of the load 260. The charging allocation determined by the server may be, e.g., an allowance to receive a full charge, or an allowance to receive a partial charge, the reception of a predetermined level of power by the load 260, or the like.

Charging Procedures

The provisioning software may provide instructions controlling one or more aspects of the charging procedure. The Hotspot may be configured to begin charging as soon as it detects a device with a secondary inductor capable of coupling with its primary inductor. The user may be notified that the charging has started. The RxID (the device credentials) and/or the TxID (the PAP credentials) may be communicated to the server to check the charging allowance for the device, Hotspot or the combination thereof. If the charging is allowed, then the server may respond with a "start charging" command, and the charging continues (e.g., the Hotspot is allowed to continue transmitting power). If the charging is not allowed, then the server may respond with a "stop charging" command, and the charging is stopped (e.g., the Hotspot's power transmission is shut off). Throughout the charging process, the RxID and the TxID, as well as the commands sent by the server, may be logged in a server log.

When the device includes a secondary inductor capable of coupling with its primary inductor but lacks a RxID (a "legacy receiver"), the lack of a RxID may be communicated to the server. The server may apply a legacy receiver policy, which may be to respond with a "stop charging" command. The lack of RxID, the TxID of the PAP involved, and the commands sent by the server, may further be logged in the server log.

The Hotspot may be requested to stop charging (e.g., "stop charging" command sent from server) for example, in the following situations: hotspot identifies that there is no RxID on the device; the policy check for the RxID+TxID returned an empty allowance; the allowance for the RxID+TxID ended, timed out; the Hotspot senses that the internal temperature has reached its defined safety limit ("stop charging" command may be triggered by the Hotspot itself); or the PAP may be configured to be activated only when a device with a secondary inductor capable of coupling with its primary inductor is placed on it.

When a "stop charging" command is sent from the server for a specific RxID and TxID, the Hotspot may verify that the RxID is still the device that is on it before executing the stop command. If the RxID matches, the charging is stopped and the Hotspot may send a notification to the server that the charging event for the TxID and RxID was stopped. If the RxID does not match, the Hotspot may ignore the command and send a 'non-matching-command event with current RxID' notice to the server so that the previous session (with the former RxID) can be closed in the server, and the current session (with the new RxID) can be opened if it's not opened already.

The Hotspots that receive a 'stop' command from the server may respond with an 'Ack' (acknowledgement) response back to the server. The 'Ack" notice may include the relevant TxID and the RxID. The server may check periodically that the 'stop' commands it sent produces an 'Ack' response back from the Hotspot. Every x minutes, the server may check the list of Hotspots (a "stop command queue") to which the 'stop' command was sent. The server may remove from this list the Hotspots that did send an 'Ack' for the same TxID+RxID. If an 'Ack' is not received after a predetermined time period, the server may send a warning message to the support event log.

When the device is removed from the Hotspot, the Hotspot may send a 'removal event' notification with the TxID and RxID to the server. The Hotspot may further confirm removal before sending the 'removal event' notification by, e.g., having a delay period while checking for presence of the same device (e.g., with the same RxID), in order to prevent false alarms when the inductive connection or communication between the device and PAP is only momentarily disturbed through, e.g., user adjustment, unintentional movement (e.g., Hotspot support movement), and the like. After the server receives the 'removal event' notification, the server may respond with a 'stop charging' command to the Hotspot (if still active), and the Hotspot may reset to a 'ready to charge' state, ready to receive another (or the same) device.

The Hotspot, device, or gateway may send a request to the server for a status update periodically, e.g., once every x seconds. The server may respond with one or more commands, such as: a 'stop charging' command, with the TxID of the Hotspot that needs to be stopped, and the RxID of the device that the server assumes is still on the Hotspot; 'charge about to end' notification for the TxID/RxID pair, with a message regarding the amount time left sent to the device, Hotspot or both, to be displayed; other text to be displayed on the Hotspot, the device or both, notifying status of charge.

The communication between the device, the Hotspot and the server may further include fraud checkups, including: The server verifying that there is no more than one concurrent request to charge a certain RxID; Concurrent charging requests for the same RxID in different locations may result with a 'black listed' RxID (there may be a need to adjust and refine tolerance to prevent blocking too quickly, for example: If a user removes a device from one Hotspot but the 'device removed' command was not sent to the server, and goes to charge on another Hotspot, the server may think that it is a duplicate RxID); The legitimate owner of a blacklisted RxID may have to request for a new (optionally free) RxID and replace it on the device. The new RxID may be provided, e.g. by a new RFID tag, or a replacement power receiver unit with the new RFID tag.

In the case of lost messages between a Hotspot and a server, the Hotspot may send a 'still charging RxID' message to the server.

Figure 7A:
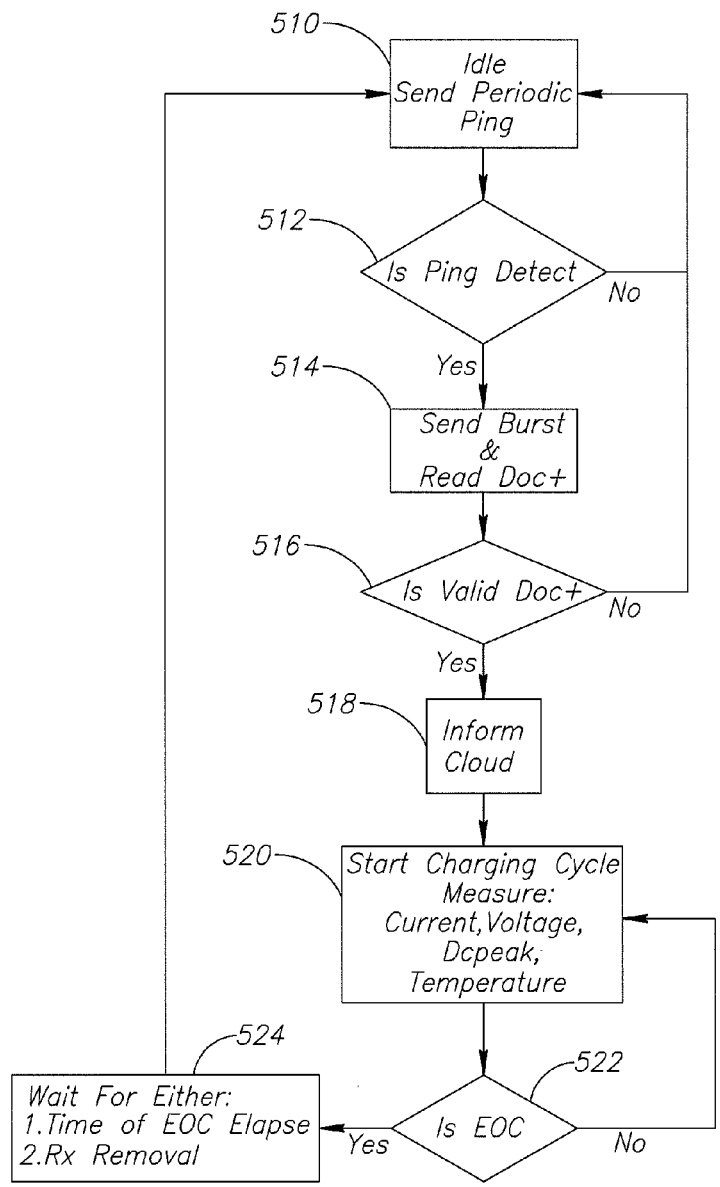
FIG. 7A is a flowchart representing another possible procedure for initiation and maintaining/termination of inductive charging.

Reference is now made to the flowchart of FIG. 7A representing a possible procedure for initiation and maintaining/termination of inductive charging between a Hotspot and a device. When a device is not present, the Hotspot may be configured to be in an idle phase, during which it periodically sends a query for the presence of an inductive entity (e.g., a secondary inductor in a device). The querying may be a "ping", which may be a momentary activation of the primary inductor, which may provide a momentary induced current in a nearby inductive entity, if present—step 510. If a ping detects a secondary inductor (step 512), the Hotspot may enter an engagement phase, at which point the Hotspot produces another momentary activation of the primary inductor, while monitoring for modulations in the power transmission current passing through its primary inductor, which may be caused by systematic modulations in the electrical properties of the device having the secondary inductor. Through such a mechanism, a signal may be passed from the device to the Hotspot, e.g., a MAC address from the device (if present)—step 514. The Hotspot may check that the presumed MAC address is a valid one—step 516. If the MAC address is valid, the Hotspot informs the cloud-based server and provides the MAC address as the RxID, as well as its own TxID—step 518. The server sends a start-charging command to start a charging cycle. The Hotspot initiates charging (or continues charging if already started), and monitors current, voltage, temperature and other features of the charging process—step 520. The Hotspot may continue to monitor for an end-of-charge (EOC) signal—step 522. In the absence of an EOC signal, the charging cycle continues. The charging cycle may end upon the elapsing of the EOC signal transmission delay and the server sends the EOC signal to the Hotspot. Alternatively, the charging cycle may end when the device is removed from the Hotspot.

When a new device is detected (by ping mechanism), the Hotspot enters the engagement phase and received a burst of modulations in the power transfer signal, which the Hotspot de-modulates into a serial, digital stream of bits, which may include a MAC Address according to the RxID format specification. The Hotspot verifies the existence and the integrity of the MAC Address. If a MAC address is not detected by the Hotspot, the RxID is defined as Null and the charging procedure follows the protocol for legacy devices. If there is evidence for a MAC address but the MAC address is not valid, the Hotspot queries the device again to re-send its MAC Address. After five attempts, the MAC address may be defined as non-valid. When the MAC address is not valid, the device may be blacklisted, or the charging procedure may follow the protocol for legacy devices. If the MAC address format is valid, it becomes the current RxID, and is forwarded to the server for charge allowance determination.

Digital communications may carry information relating to various factors such as operational data, supplementary data, identification data or the like. For example, operation data may include load characteristics, load identity, desired operating parameters, actual operating parameters or target operating parameters, such as induced voltage, induced current, required current, operating temperature, charge level, or such like. Supplementary data may include location data, synchronization of data, media files say, streamed media or the like.

Where appropriate, such digital communications may be used to provide additional power transfer management. For example, the digital communications may be used to communicate inter alia data relating to: the resonant frequency of the system, the selected range of operational frequencies, the sizes of increment values of frequency or power by which the driver changes the power level when a P-UP signal, P-DOWN signal, P-DUP signal or the like is received, load or receiver specific maximum power levels, limits above which the inductive power transmitter should not transmit power, power limiting for safety, etc.

It is particularly noted that the digital communication may be used to pass identification data between the inductive power receiver and the inductive power outlet. Identification data may include, for example, a device specific identity code, a user specific identity code, a receiver specific identity code or the like. Such identification codes may be used to pair a specific inductive outlet (e.g., a Hotspot assigned with a TxID) to a specific inductive receiver (e.g. a device assigned with a RxID). It is noted that identification codes may be of particular utility in commercial systems where the identity of the user or receiver may be used to determine the permissions of that receiver to draw power from that outlet, to determine billing procedure for that power drawing action, to monitor the behavior of a particular user or receiver or the like. Still further uses for the data communication will occur to those skilled in the art such as those described in the applicants copending applications, U.S. Ser. Nos. 61/682,604 and 61/584,268, which are incorporated herein by reference in their entirety. See also international application PCT/IL2012/050142, which is incorporated herein by reference in its entirety.

It is further noted that identification of the receiver (RxID) may be used to determine user specific actions such as adjusting local environment. For example in a vehicle based system a inductive transmitter may use identification data received from an inductive power receiver to adjust the mirror, seat orientation, seat temperature, air conditioning, radio selections and the like to suit the personal preferences of the user. In another example, in a household environment the inductive transmitter may use identification data to cancel alarms, adjust the ambience, lighting, media preferences or the like to suit the user.

Furthermore, identification data may be used for billing purposes or may be used to determine personalized advertising targeted to the user.

Digital communications may be transmitted using a signal transfer system embedded in the circuitry serving the inductive power transmission between the Hotspot and the device. It will be appreciated that digital communications may be constructed from multiple bits of information each of which may have a logic state 0 or a logic state 1. The signal transfer system described herein may assign logic state peak pulses having differing characteristic frequencies to represent logic state 0 and logic state 1 and therewith to construct digital data. By way of example a logic state peak pulse may be assigned a characteristic frequency such as 2 kilohertz, 4 kilohertz, 5 kilohertz, 6 kilohertz, 10 kilohertz, 50 kilohertz or the like.

Optionally, a dedicated characteristic frequency peak pulse may be reserved for a logic state peak pulse. Alternatively, where required, a logic state peak pulse may share a characteristic frequency with one or more instruction signals.

It will be appreciated that communications, or messages, may be constructed from multiple bits. Strings of bits may represent bytes of information. Where appropriate, a byte may be characterized as a string of 10 bits: a BitST, Bit0, Bit1, Bit2, Bit3, Bit4, Bit5, Bit6, Bit7 and BitSP. The initial bit BitST may be a START bit used to indicate that the following string of eight bits represent a byte and BitSP may be a STOP bit used to indicate that the byte has terminated. According to a particular example BitST may set to logic state 0 to indicate initiation of a byte of data and BitSP may be set to logic state 1 to indicate the byte's termination.

A processor associated with a peak detector of the primary inductor of the Hotspot power may be operable to interpret peak pulses of various characteristic frequencies differently depending upon the timing of the transmission and the operational phase during which it is transmitted.

For example, a peak pulse having a certain characteristic frequency, which is used as an instruction signal during power transmission, such as described above, may be used as a logic state pulse signal otherwise. Accordingly, in a non-limiting example, during an initial identification phase, a peak pulse having the characteristic frequency of an ID signal may be used to represent logic state 0 and a peak pulse having the characteristic frequency of the P-SAME, say, signal may be used to represent logic state 1. Whereas during transmission phase P-SAME may be used to instruct the driver to continue to drive the primary inductor.

It is further noted that during transmission, one logical state may be represented by an unambiguous characteristic frequency and the other logical state may be represented by any one of a set of other characteristic frequencies.

For example, logic state 0 may be represented by its own characteristic frequency MsgBIT, say 6 kilohertz. By contrast, logic state 1 may not have its own unique characteristic frequency. Instead, any of the other characteristic frequencies may be interpreted as representing logic state 1 by the processor associated with the peak detector of primary inductor of the Hotspot.

It is noted that, where multiple characteristic frequencies are all interpreted as the same logical state, the selection of the characteristic frequencies used may convey another level of information concurrently with the digital message. Thus, for example, during transmission, a digital message may be communicated using the MsgBIT frequency to represent logic state 0 while selection of the characteristic frequency for logic state 1 may be determined by the transmission requirement of the system at that instant. Accordingly, in the example:

if the power received by the inductive receiver is below a required level, the power increase signal P-UP may be used to represent logic state 1, such that the driver also increases the power level by an incremental value, if the power received by the inductive receiver is above a required level, the power increase signal P-DOWN may be used to represent logic state 1, such that the driver also decreases the power level by an incremental value, if the power received by the inductive receiver is within a required range, the power increase signal P-SAME may be used to represent logic state 1, such that the driver continue to drive the primary inductor with the same power level, and if the load requires no more power, the termination signal END-SIG may be used to represent logic state 1, such that the driver ceases to drive the primary inductor and the inductive power outlet reverts to standby mode.

Accordingly, it is a particular feature of the present disclosure that digital communications may be transferred from the inductive receiver to the inductive outlet concurrently with power transmission regulation signals.

It is also noted that the digital communication may be used to provide a digital ping. Optionally, a digital ping phase may be used to identify that the receiver is valid for example. In order to engage with a possible receiver, a digital ping is generated. This digital ping may have a pre-defined structure regarding the frequencies and timing that should be used. If sufficient power is delivered to the receiver, it will respond by modulating the power signal according to the communication protocol. Where the transmitter received a valid signal from the receiver, it may continue to an identification phase without removing the power signal or a power transfer phase.

Optionally, inductive power receivers (devices) may have characteristic identification codes MACID which may be communicated in an ID signal (RxID), accordingly, the receiver may be operable to identify itself to the inductive power outlet by sending the identification code MACID in the ID signal (RxID).

According to one example protocol, where the receiver responds to the digital ping, the receiver may transmit a characteristic frequency peak pulse, say the P-SAME signal. The receiver may be operable to transmit such a signal within a millisecond after entering the ping phase and may continue transmitting this signal for an identification period tID before continuing to an identification phase. Optionally, entry to the digital ping phase on the receiver may be considered as the point where the bridge voltage of the Receiver reaches an initial rectified voltage Vstart required to bring the communication and control unit to an active state.

Where appropriate, the RxID message structure may comprise a string of bytes such as described herein. The byte string may comprise a preamble byte, a message ID byte, the MAC identification (MACID), which may itself comprise a string of six bytes, and a two byte cyclic redundancy check (CRC). Optionally, in a particular embodiment, the Preamble byte is fixed to 0x00 and the Message ID byte is set to 0xAA. It will be appreciated that other messages may be defined as suit requirements. Optionally, where required, a Certification-Version byte may be included possibly between the messageID byte and the MACID field.

According to a particular embodiment, the receiver may use the following flow of operation: On the completion of the Digital Ping phase, prior to enabling charging to the device, the receiver may transmit a "RxID message", to make sure it is a fully compliant device. A guard-time of 20 milliseconds is provided, during which the transmitter calculates the CRC of the RxID message and the receiver transmits P-SAME signals. Once the guard time is over, the receiver may enter a power transfer phase.

The inductive power outlet may receive the RxID message and calculate the CRC, while maintaining the power level stable. If the CRC is valid, the inductive power transmitter will move to power transfer phase. If the CRC was not valid, the inductive power transmitter will remove the power carrier and transition to the standby phase. It may then restart the Digital Ping phase with the receiver and repeat the identifications attempt.

RFID Reader-Enabled Hotspot

Figure 7B:
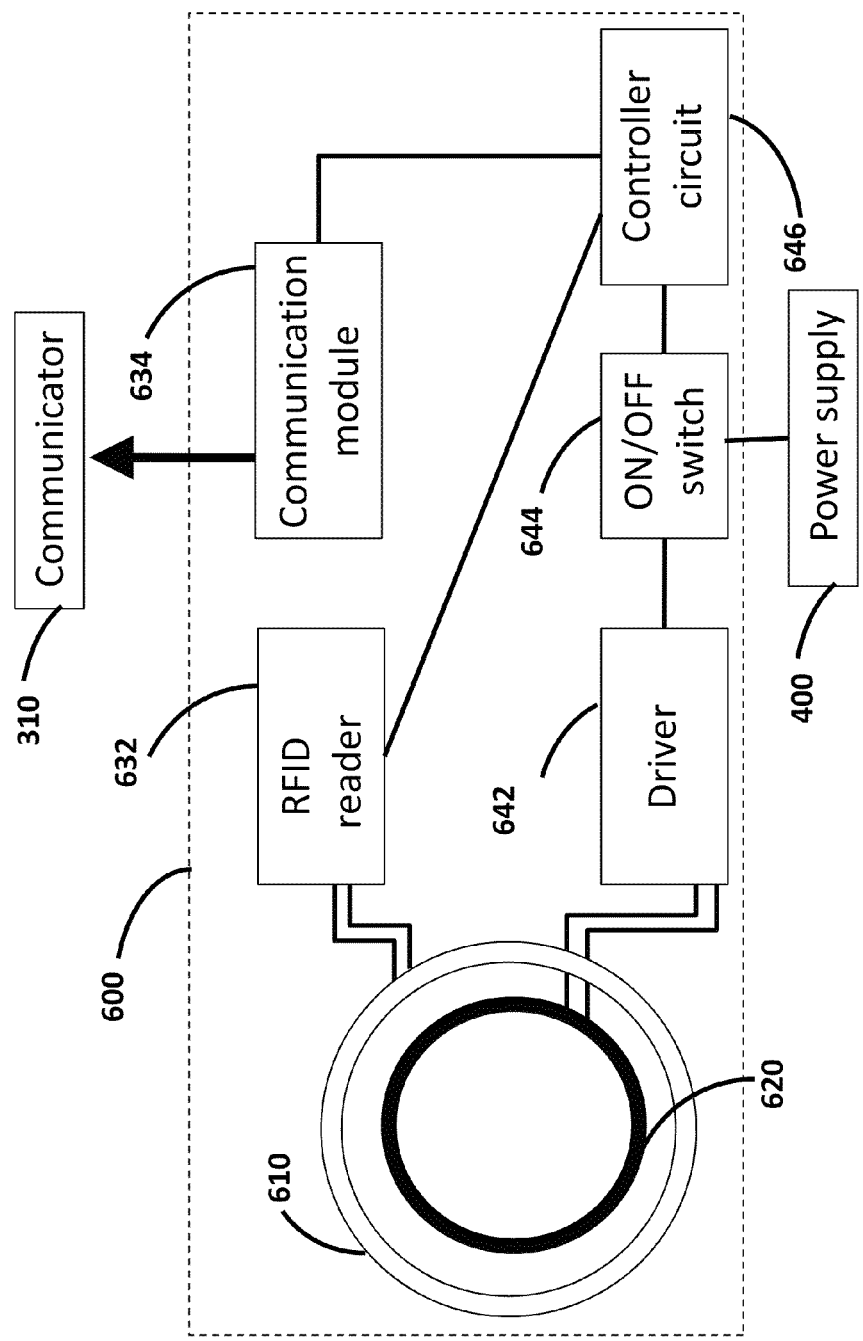
FIG. 7B is a block diagram representing a possible embodiment of a power access point.

Reference is now made to FIG. 7B showing an exemplary embodiment of a Hotspot 600. The Hotspot 600 may include an RFID antenna 610 wired to an RFID reader 632. The RFID antenna 610 may be operable to receive information from an RFID tag located on a device placed on the Hotspot 600. The information from the RFID tag may include, e.g., a RxID assigned to the device. The Hotspot 600 may further include a primary coil 620 wired to a driver 642. The driver 642 may be connectable to a power source 400 via an ON/OFF switch 644. The ON/OFF switch 644 may be control by a controller circuit 646. The controller circuit 646 may be wired to a communication module 634, which is configured to communicate wirelessly with the server (not shown) via a communicator 310 (which may alternatively be referred to as a gateway). The controller circuit 646 may be operable to send and receive information (e.g., RxID of the device placed on the Hotspot, TxID of the Hotspot, notifications, commands and the like) with the server (through the communication module 634 and the communicator 310), as well as receive RxID information, when present, from the RFID reader, thus coordinate the activation of the Hotspot 600 with the server.

The RFID tag may be designed to supply means of identification for a unique user through its receiver (i.e., a RxID). The basic level of identification may be of a uniquely identified receiver of an anonymous user, while an advanced identification may provide cross-referenced data regarding a unique RxID and the real user that owns it.

RxID enables many advantages, including the following, even at the basic level of identification, and the advantages are enhanced when the advanced identification exists:

RxID enables user usage statistics—The RxID may be served as a unique ID for a receiver that can be identified by the Hotspot 600. The Hotspot 600 can report to the server when a certain device was placed on it and when it was removed. Collecting this data over time and multiple devices results in a dataset of usage patterns and usage trends, even at the basic identification level in which only unique receivers are tracked. The information becomes yet more valuable if a user registers with an RxID so that device usage patterns can be attached to an actual user account and details.

RxID enables device usage statistics; By linking a certain RxID tag to a certain device at manufacturing or later, statistics about usage for certain types of devices may be collected, which enables identification of problems or issues with a production batch or a product type.

RxID enables a policy management mechanism—When users are identified (basic or advanced), the execution of a policy management mechanism becomes possible. An identification method enables various services, such as enablement of certain free time to users a day, or distinct policies to user groups/individuals.

RFID tags and receivers may communicate at a frequency that is free of charge to use, e.g., 13.56 MHz. The RFID tag information communicated to the RFID reader may be encrypted. The RFID identification time may be 2 seconds or less, or 1 second or less. The RFID tag an RFID reader, as well as the surrounding components of the hotspot 600 and the device may be configured to enable the operation of two parallel RFID antennas that are placed 5 inches or less apart. The RFID reader may be operable to read a RFID tag situated up to 3 cm above the flush surface of the Hotspot (where the device with the RFID tag is placed).

The RFID reader may be operable to identify the RxID of multiple devices (up to 4-5 or more devices) placed in range, and relay the information to the server (e.g., through the controller circuit 646 and communication module 634.

The RFID reader may be configured to operate without disrupting the operations of a built-in Near Field Communications (NFC) module (if present).

The RFID reader may be operable to read an RFID tag retrofitted onto a legacy receiver device.

The overall power consumption of the Hotspot 600 may be about 0.5 W/day or less than 0.5 W/day.

The communications module 634, which mediates wireless communication between each Hotspot 600 and the communicator 310 (leading to the server) may be a Zigbee module. Zigbee is a specification for a suite of high-level communication protocols using small, low-power digital radios. The communications module 634 may be capable of operating in a 2.4 GHz-rich environment, e.g., WIFI in shops, wireless accessories such a cordless mouse or cordless earphones and other transmitting devices, as well as Bluetooth. The Zigbee may run a qualified Z.B Protack. Each Zigbee node may be operable to work as non-sleepy end-point and Zigbee router. The Zigbee module may further include a built-in antenna, have a UART interface to the Main MCU, and may be operable to reset the Hotspot via remote command from the cloud or the server. The data transferred by the communications module 634 may be encrypted. The wireless connection between the communications module 634 and the communicator 310 may be strong enough to go through two or more brick walls, such that the connection may remain functional with the communicator 310 installed in a back room secluded from the room with the Hotspots 600, with additional objects, such as people or metallic objects passing between the Hotspots 600 and the gateway.

Once a user places a device on the Hotspot 600, charging may begin instantaneously so that user experience is equivalent to the user experience with retail products. Following an immediate charging, the Hotspot 600 and/or device may execute a process of credentials checking, where the RxID and/or the TxID is sent to the server to determine whether or not the charging of the particular device with the particular Hotspot 600 is allowed. An allowance results in continued charging of the device by the Hotspot 600, which while a non-allowance results in the termination of charging. The on/off switch then provides a means of denying charging upon a server command that is based on policies.

When communication to the server is not available, an 'off' command may not be received from the server, thus charging may not be stopped. This may provide a default 'On' experience in case of server communication problems.

One power source 400 may provide power to multiple Hotspots 600. The Hotspots 600 may be configured such that up to ten Hotspots 600 may be supported by one power source 400.

The Communicator 310 mediates the connection of one or more Hotspots 600 to the server, which may be cloud-based. The communicator 310 may support the connection of up to 50 Hotspots 600.

The server may support a service platform that provides the ability to supply wireless charging service on Hotspots in public places. The server may hold a set of policies that define the allowance of charging time for users on Hotspots, and may be able to switch Hotspots off when the allowance ends. The server may provide services to several groups of devices and users. The backend engine functionality as well as the functional features for each type of user of the system will be described hereinbelow.

To calculate the charging allowance of a device placed on a Hotspot, the server may receive a notification of charging start for a device (identified via RxID) and a Hotspot (identified via TxID). The server may confirm the allowance of the device for charging based on remaining time in the one or more layers of the service plan.

If allowance=0 an immediate 'Off' command is sent back to the HS, with the RxID, so that the HS will execute it only if the device with the same RxID is still on it.

If allowance>0, the server adds an 'Off' command to a queue to be sent later to the HS at a specified later time.

The HS may execute the 'Off' command upon receipt. The HS may not have an internal clock, with the server being the component that calculates the allowance time and sends the 'Off' command on time.

In a case where multiple RxIDs are detected by one Hotspot, the server checks the allowance of all of the tags together. If only one of the RxIDs has an allowance and all the rest do not, the server will base the subsequent commands on the RxID with the allowance.

The allowance for the device on the Hotspot may be determined according to multiple levels of service layers, e.g., 3 levels: as a first level, all users may receive a free allowance of a specified period of time of $T_{free}$. $T_{free}$ may be renewed every day, and may be used at any one or more locations that provide the charging service; as a second level, users may be qualified for a chain promotion or a specific store promotion that provides an additional portion of time for free charging; or as a third level, users may purchase charging packages.

The server may maintain the charging balance of individual users/devices. The daily balance may be impacted by the following: the $T_{free}$ allowance that may renew daily; charging start time for the RxID; charging stop time for the RxID, removal of the device associated with the RxID from the Hotspot; qualification of RxID for store promotion; status of the user purchased charging package.

The charging package may be an unlimited service plan that allows unlimited charging on all Hotspots for the duration of the plan, e.g., day, week, month, year and the like. Alternatively, the charging package may be an invoicing plan, where the user is allowed to charge the device freely on any Hotspot, and is then invoiced subsequently for the usage on a regular basis, e.g., on a monthly basis. The charging package may be purchased as an independent user, or as a corporate user that incorporates multiple users within a group.

Figure 7C:
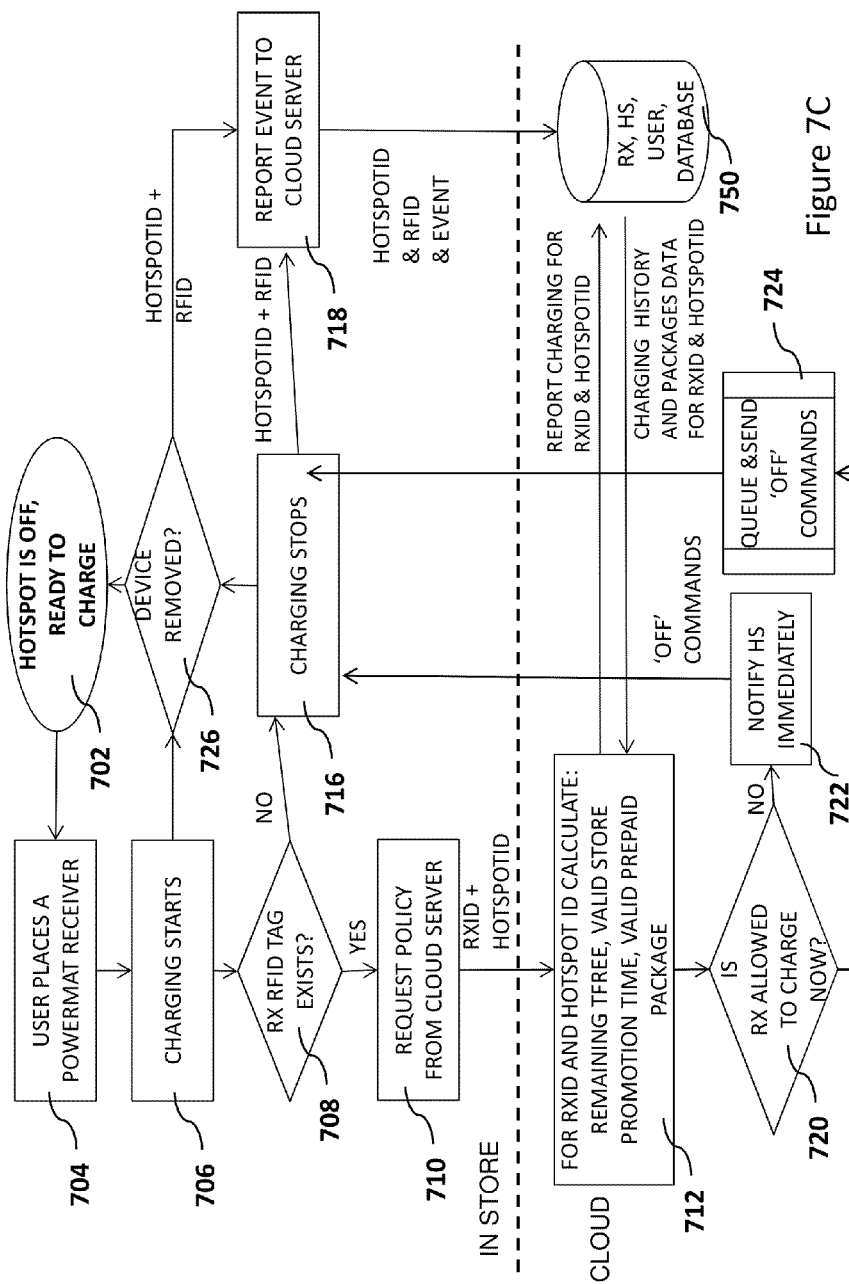
FIG. 7C is a flowchart representing another possible procedure for initiation and maintaining/termination of inductive charging.

Reference is now made to the flowchart of FIG. 7C representing a possible procedure for initiation and maintaining/termination of inductive charging between a Hotspot and a device. Initially, the Hotspot may be held in a 'ready' state—step 702. A user may place a device on a hotspot—step 704. The hotspot may sense the placement and initiate charging—step 706. Where appropriate, the hotspot controller may wake up the RFID reader. The RFID reader may search for an RFID tag on the receiver to verify its existence—step 708. If an RFID is discovered, a policy may be requested from the cloud server, identified by RxID of the device and TxID of the Hotspot—step 710 and a message may be sent to the cloud server 750 stating that a receiver with a designated RxID has started to charge.

The server may use the TxID information with the RxID information to log the fact that a device with the specified RxID started to charge on a Hotspot with the specified TxID. Furthermore, the server may retrieve information from a user and policy database or the like and possibly from external user management systems for example, regarding applicable policies and user plans—step 710. Where appropriate the server may further calculate the charging allowance for that user at that place at that date and time and log the result of the calculation—step 712.

If no RFID is discovered within a given time, say, three seconds, charging is stopped—step 716 and a notification message may be sent to the cloud server, reporting the event—step 718, stating that an unidentified receiver has started to charge. Optionally, the Hotspot may register to itself which RxID is coupled thereto.

The cloud server may test if the device/user with the specified RxID is allowed to charge—step 720. Where the user is not permitted to charge for any reason, the Hotspot may be notified and instructed to cease charging forthwith by sending an immediate OFF command—step 722. If the user is permitted to charge the cloud server may respond by sending a delayed OFF command for that TxID and RxID for a specific time to the pending queue—step 724, of OFF commands. The relevant batch of OFF commands may be sent to the Hotspots on the scheduled periodic Gateway request from the cloud server to stop charging—step 716.

When the hotspot gets an OFF command from the cloud server, it compares the RxID of the device that is placed on it with the RxID for which the command was sent. If there is a match the Hotspot turns itself off and may additionally send a log message to the cloud server that it executed the OFF command for a particular receiver RxID on a particular hotspot TxID, reporting the event to the cloud server—step 718. Where there is no match, for example, if the device was removed from the Hotspot—step 722 and it is now empty, or another device is placed upon it the hotspot does not change its status and may send a log message to the cloud server that the OFF command was not executed for RxID+TxID due to a no-match—step 724. Furthermore the Hotspot may stop charging when it senses that a device was removed therefrom—step 726.

Management Console

The system provide for a management console software that may provide a manager of a premises with the ability to manage the hotspots that are installed therein. The management console may be accessed through a web browser or an application on a computer, laptop, tablet and the like.

The management console may allow a manager to, e.g.: View real time on/off status of hotspots; View usage statistics and generate reports per user/location/hotspot/time; create, edit, and assign usage policies per location/day-of-week/time/user.

The system may provide three levels of access and administration: Administrator, MAdmin and MUser.

Administrator-level managers may have administrative rights to access all the information and the settings in the system.

MAdmin-level managers have access to the general settings for all the locations of a specific premises or group of premises. The MAdmin can create/delete/edit MAdmin and MUser accounts and assign rights to them.

MUser-level managers may have rights to one or more locations, for which he can view statuses, manage policies and get reports.

In certain embodiments, the system may have a flat hierarchy of the MUsers, where MUsers cannot be defined as managers of other MUsers, and there is no inheritance of rights from one user to another in a hierarchical way. Alternatively, the MUsers may be arranged hierarchical structures Each customer may start with one MAdmin account, which may then create other MAdmin and MUser accounts. When an Admin account is created, the following may be set: Company, type of admin, full name, phone, email, rights to manage a certain list of locations, and the like.

All the activities that MAdmins and MUsers perform in the system may be logged in a system log (Date/Time, user, type of activity, details).

The management console may allow a MAdmin or MUser to view a schematic diagram of the location of the Hotspots in a premises. The diagram may denote the status of the Hotspots with color or pattern indications. The status may include On, Off, Note-Used-Recently, faulty, and the like. The management console may also be operable to display usage statistics per user/Hotspot/time, in the form of, e.g., graphs on screed, formatted printable report, exportable CSV format and the like. Other possible reports include, e.g., charging patterns over time, list of Hotspots used and number of usages per each over time, list of locations with user charged and/or number in visits over time, statistics of usage of each type of user plan. For the graphs the time scale may have a slider that enables adjustment of the time scale—from data points every 1 minute to data points every one week. It is possible to have a non continuous scale, e.g. 1 minutes-15 minutes-1 hour-4 hours-1 day-1 week.

A MUser can set policies for the 'Store promotion' layer of service: Add free charging minutes on top of $T_{free}$, based on criteria. A user/user group that qualify may be allowed to charge their device for free, variously, for: a specified number of minutes; at specified locations; during specified days of the week; at specified time slots. A policy may have a validity duration, e.g., valid between Date1 and date2, where date1<=date2 and date2 can be equal to 'no expiration'.

An administrator of the server may have the access to perform one or more of the following actions in the system:

The Administrator (Admin) may be able to do everything that a MUser can do, and may have rights to all customer accounts and all locations.

The Admin may be able to overrule a policy for a specific device (by RxID) by overriding the base policies for that device. Such devices may be used at installation or at maintenance times to validate the proper operation of a Hotspot. The policy override may be time limited and may revert back to previous default policy when the time is up. The Admin may have access to devices that are designated with 'always on' or 'never on' policies, which may be referred to as "Golden Receivers".

The administrator may have visibility into the wellbeing of the installed components, e.g., alerts for gateways that did not communicate with the server over a specified period of time, alerts for Hotspots that did not communicate with the server over a specified period of time, and the like.

User Interaction

The provisioning software may provide for user interaction that comprises one or more of the following features:

The user may be able to open a user account.

The user may be able to register one or more devices that belong to his account. Registered devices may have one or more of the following properties: owner contact details (email, SMS phone number or the like), permission to contact using supplied contact details, Model, User ID (text), user-name (optional, could be different family members) and place of purchase.

The user may be provided with access to usage information, e.g., usage graphs, report on history of Hotspot visits, and the like. Information may be presented per user or per device.

The user may be provided with access to an online store for components relevant to the charging system or its use, or with a guide to retail stores providing the same. The online store may allow purchase of charging times, permissions, and the like.

The user may be provided with access to charging time available, or to a report regarding the same.

Information may be presented to the user through the application, or through other communication means available to the device, e.g., email, SMS, and the like.

The provisioning software running on the device may receive the TxID and/or the location of the Hotspot. Information regarding the location of the Hotspot may be associated with the TxID. Such location information may be programmed into the Hotspot at, e.g., the time of installation, and may provide very accurate location information, which may be more accurate than what may be provided through other methods, such as GPS or antenna triangulation. Where the provisioning software is an application, the Hotspot may transmit information regarding itself (e.g., TxID, location, and the like) to the device, which then transfers the information to the application. The application may further identify the locating using GPS, antenna triangulation, in-door positioning methods and the like.

Further, the application may interact with the OS, e.g., through the OS's API, to use the device's communication capabilities to connect to the server and, e.g., request the charging policy for the device in relation to the Hotspot or Hotspot location, at the given day/time, and receive the allowance policy details to charge the device. If communication with the server cannot be established, the application may allow the providing of charge based on a predefined "offline policy".

Business-to-Business Integration of the Server

The server may be capable of integration with external servers or services. Some integration may be for data enhancements and external validation of rights for users, and others may be for managing a certain functional aspect of the system, such as: User management; Billing; Advertising; and Policies management with external dependencies Various functionalities may be available through the provisioning software, and may also be available in third-party applications through application programming interfaces (APIs) for the server or a client application. The functionalities include: using GPS, antenna triangulation, or in-door positioning location information to display a map with nearby public hotspots; booking a Hotspot in advance. The booked Hotspot will not charge for other users, only for the registered user when he arrives, when identified by the unique RxID; registering devices; checking charging statistics; buying accessories, charging policies; checking real-time charging balances for registered devices; setting notification methods, receiving notifications; setting an automatic check-in to the Hotspot location; setting automatic interactions with social networks, e.g. automatic check-ins, tweets, status updates, and the like; providing store-specific promotion updates via, e.g., push notifications, based on past and current usage of charging services and user's micro-location; using accumulated information of the usage of the charging service, including locations, etc., to better target users with promotions/ads; creating loyalty plans for venues based on usage of the charging services in their premises; providing services to users based on information that their social-network connections are/were at a close proximity; and launching a third party application on a user's device based on past or current usage of charging services and user's micro-location.

Usage Scenarios

By way of example only, a number of usage scenarios of the power provision system are described hereinafter:

According to a first usage scenario a web application may be set to a default time limit of 1 minute, or so, of time based credit with no free or blocked periods defined. A user may launch a power provisioning software and accesses the power provision screen. A code may be entered into the power provision screen and the charging credit may be updated to the default value of say 1 minute.

The user may enter the power provisioning software screen and tap on an initiation button such as a "touch to charge" button or the like.

A communication device such a mobile telephone, smart phone, PDA or the like may be connected to the power provision point. For example a device having an associated inductive power receiver may be placed on an inductive power outlet and power transfer, for example charging of the device, may begin.

While power is transferred, or the device is charged a countdown popup may be displayed optionally along with dynamic promotions.

The web application may be operable to indicate that the power provision point is busy. Optionally, where applicable, the web application may further display the remaining time until a device will be charged and this may be synchronized with the counter of the power provisioning software on the device.

Optionally, again, promotion popup may be displayed during or after the power provision is completed.

According to another usage scenario, the web application may define an initial blocked period. The user may enter the power provisioning software screen and tap on an initiation button such as a "touch to charge" button or the like.

The communication device such a mobile telephone, smart phone, PDA or the like may be connected to the power provision point. For example a device having an associated inductive power receiver may be placed on an inductive power outlet or a conductive charger may be connected to an electric device.

A notification message may be displayed informing the user that charging is blocked. A user may be prompted to add credit to the user account, for example by entering a code or supplying payment details. When such payment is made, the web application may be unblocked and the time based credit updated to 1 minute, say.

Where necessary, the device may be reconnected to the power provision point and the user may again enter the power provisioning software screen and tap on a "touch to charge" button.

While power is transferred, or the device is charged a countdown popup may be displayed optionally along with dynamic promotions.

The web application may be operable to indicate that the power provision point is busy. Optionally, where applicable, the web application may further display the remaining time until a device will be charged and this may be synchronized with the counter of the power provisioning software on the device.

Optionally, again, promotion popup may be displayed during or after the power provision is completed.

According to still another usage scenario a web application may be set to a longer time limit of say 2 minutes, of time based credit. The power provisioning software may include a "Battery low scenario" which a user may access, for example, by selecting a "more options" link on a bottom bar of the application screen.

Accordingly, a low battery push notification may be displayed. The user may launch the application with "low battery" option.

Optionally, the user may select a feature to find a charging station. For example, the user may be presented with a map indicating the locations of nearby power provision points or charging stations, perhaps using a global positioning system to provide current location. The user may further select a particular power provision point on the map and be presented with directions as well as other details, such as associated special offers and the like, as required.

In other options, a power provision application may provide a locator feature using augmented reality to indicate the locations of nearby power provision points upon an overlay superimposed upon an image captured from the devices camera. An example of such a display is shown in FIG. 8K.

Additionally or alternatively links may be provided to social media allowing a user to communicate with or access feedback from other users of various power access points and their environments.

Having identified a power provision point, the user may return to the home screen, perhaps by tapping anywhere on the current screen. The Power provision software may be initiated by selecting an initiation button such as a "Touch to charge" button or the like.

A communication device such a mobile telephone, smart phone, PDA or the like may be connected to the power provision point. For example a device having an associated inductive power receiver may be placed on an inductive power outlet and power transfer, for example charging of the device, may begin.

While power is transferred, or the device is charged a countdown popup may be displayed optionally along with dynamic promotions.

The web application may be operable to indicate that the power provision point is busy. Optionally, where applicable, the web application may further display the remaining time until a device will be charged and this may be synchronized with the counter of the power provisioning software on the device.

Optionally, again, promotion popup may be displayed during or after the power provision is completed.

Power Provisioning Software

Figure 8B:
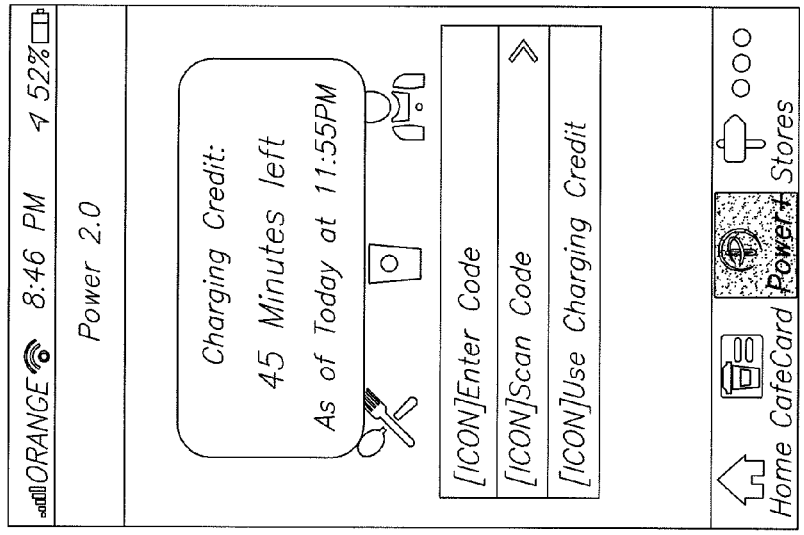
FIG. 8B is a possible screen shot of a second level screen of a power provisioning software.
Figure 8A:
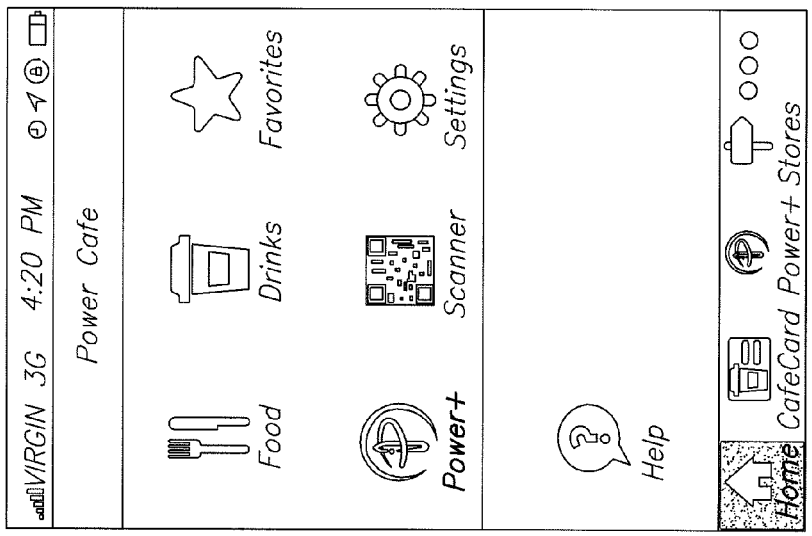
FIG. 8A is a possible screen shot representing a home screen of a power provisioning software application, which may be installed and accessed from a mobile communications device.
Figure 8D:
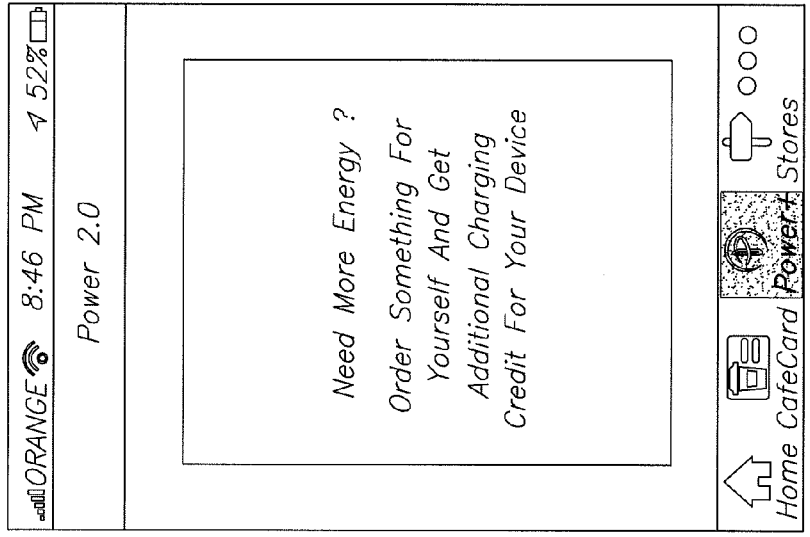
FIG. 8D is a possible screen shot of a "Charging complete" screen of a power provisioning software.

In order to better illustrate the possibilities of the power provisioning software, FIGS. 8A-J show a selection of possible screen shots of a graphical user interface for a touch screen of a mobile device executing the software, which may be in the form of a pre-installed or downloaded application or a part of the device OS. Referring particularly to FIG. 8A, a possible screenshot is represented of a home screen of a power provisioning software which may be installed and accessed from a mobile communications device such as a computer, smart phone, a tablet computer, games console or the like.

The home screen icons may direct the user to other screens providing various functionality such as described herein. For example, a first icon may direct to a second level "Power 2.0 screen" such as shown in FIG. 8B, a second icon may direct a user to a "Scan code screen" such as shown in FIG. 8E, a third icon may return a user to the home screen, a fourth icon may direct a user to a "Café card screen" such as shown in FIG. 8F, a fifth icon may direct a user to a 'Credit charging' screen, a sixth icon may direct a user to a "Power access point locator screen" such as shown in FIG. 8G.

FIG. 8B shows a possible screen shot of a "Power 2.0" screen of a power provisioning software. It is noted that the remaining charging credit may be displayed in an alert alongside an indication of relevancy of the information, for example, a date and time stamp from last update. The data may be updated when a code is entered. Further it is noted that the charging credit may decrease when charging is active, indicating that credits are being used.

Optionally the code entry selection may be activated to access a keypad via which a user code may be entered. Input may be added on the item itself. Once code is added the charging credit may be updated, perhaps by connecting to a remote control server. Alternatively or additionally, code entry may be facilitated by a code scanner which may be activated by opening the camera for example.

Once credit is updated on this screen, the user may be redirected possibly following a short delay to a "Charging screen". Optionally, selecting 'Use charging credit' may direct a user to the "Charging screen". The "Charging screen" may be in standby mode until charging is initiated.

Figure 8C:
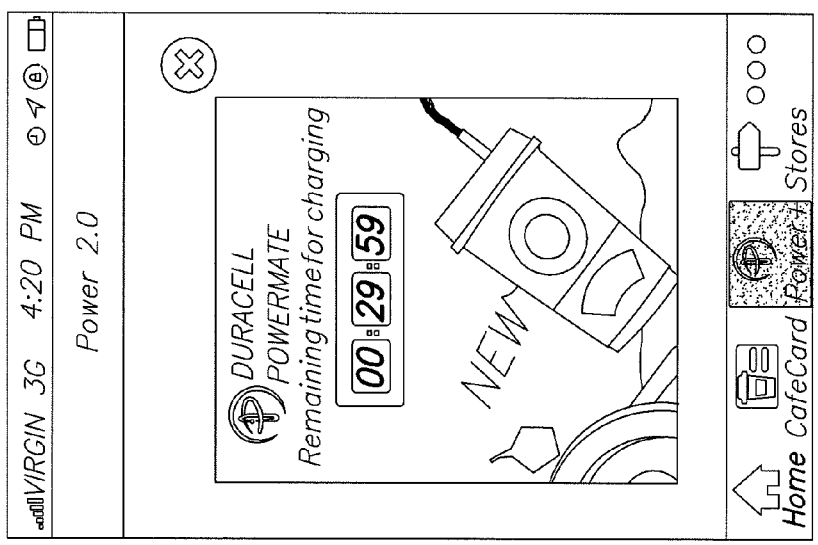
FIG. 8C is a possible screen shot of a "Charging" screen of a power provisioning software.
Figure 8F:
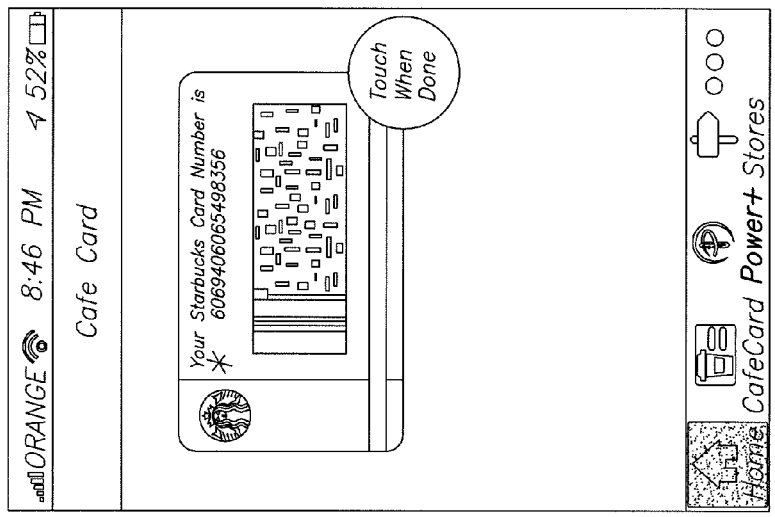
FIG. 8F is a possible screen shot of a "Café card" screen of a power provisioning software.
Figure 8E:
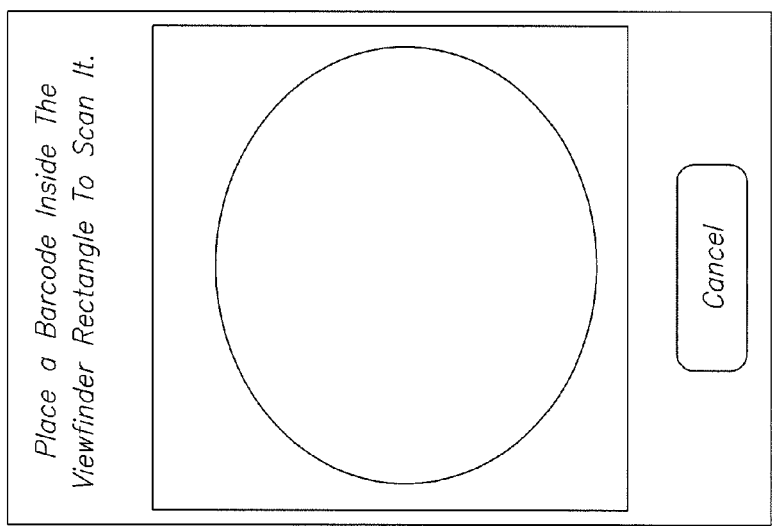
FIG. 8E is a possible screen shot of a "Scan code" screen of a power provisioning software.

FIG. 8C shows a possible screen shot of a "Charging" screen of a power provisioning software. The Charging screen may be displayed as popup notification screen. The charging screen may be a dynamic and interactive user interface. Optionally the screen may have a number of states including: standby, waiting for power, charging and charging complete or the like, as required.

In waiting mode, an icon or text such as "Waiting for power" may be displayed to indicate that charging is not initiated. Optionally, an animated waiting icon, such as a sandclock, three dots, rotating dots, or the like may be displayed.

Upon initiation of charging, the screen may move to charging mode. Text may be displayed such as: "Remaining time for charging . . . " alongside an actual count down according to actual state in real time. A promotionally image may be displayed periodically, say every 10 seconds or so, for example in a loop mode.

Once charging ends, the screen may move to 'charging complete' mode as shown in FIG. 8D. Optionally, the notification may have a close icon, such as an X or a selection button, for closing the notification and redirect the user to home screen.

FIG. 8D shows a possible screen shot of a "Charging complete" screen of a power provisioning software. Upon termination of charging text may be displayed such as "Need more energy? Make an order for yourself and get extra energy for your device", for example. Optionally, the "Charging complete" screen may include a promotional image. The "Charging complete" screen may further include an option to "Get more charging credit?" that will direct to the home screen or the "Power 2.0 screen". Optionally, the notification may have a close icon, such as an X or a selection button, for closing the notification and redirect the user to home screen.

FIG. 8E shows a possible screen shot of a "Scan code" screen of a power provisioning software. The scan operation may open the camera with a viewfinder rectangle. Once the code is added the charging credit may be updated. A cancel button may return a user to the previous screen such as the home screen or "power 2.0" screen.

Figure 8H:
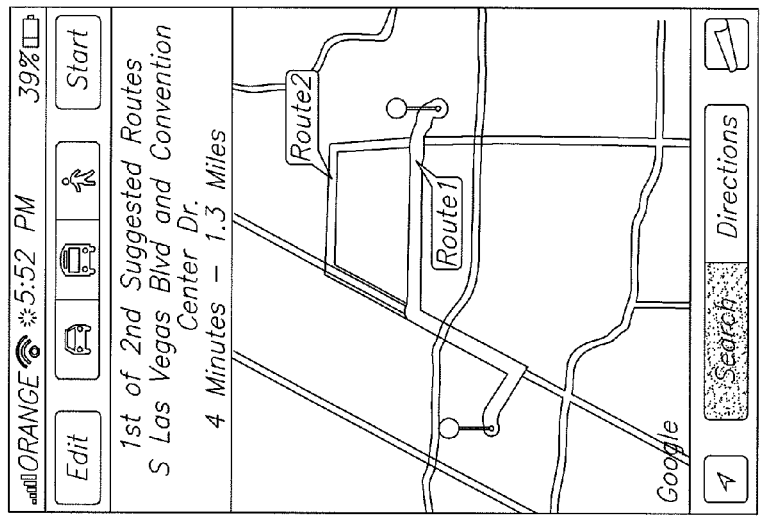
FIG. 8H is a possible screen shot of a "Get Directions" screen of a power provisioning software.
Figure 8G:
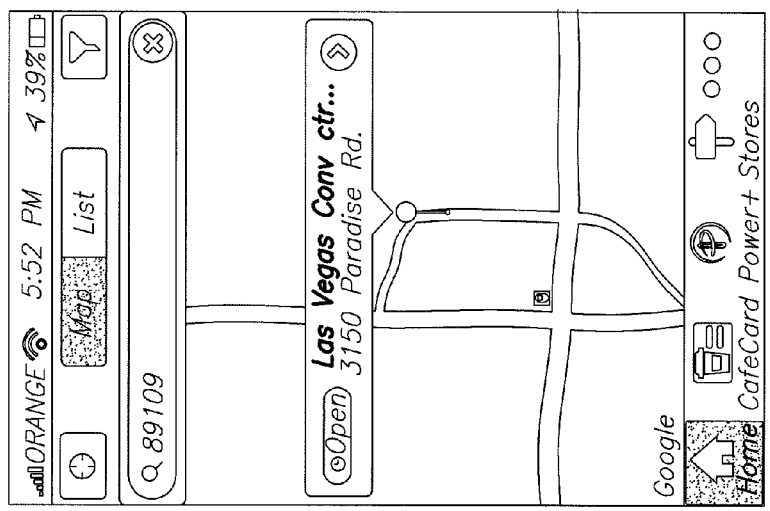
FIG. 8G is a possible screen shot of a "Power Access Point Locator" screen of a power provisioning software.
Figure 8J:
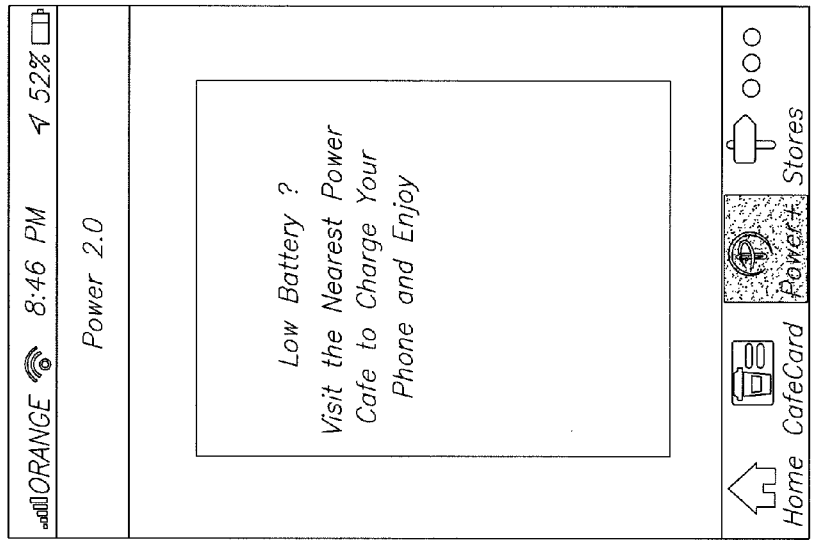
FIG. 8J is a possible screen shot of a "Low Power" popup screen of a power provisioning software.

FIG. 8F shows a possible screen shot of a "Café card" screen of a power provisioning software. The screen may allow a user to scan a code associated with a Café card or the like. The screen may display the current credit on the café card, possibly alongside a time stamp FIG. 8G shows a possible screen shot of a "Power access point locator" screen of a power provisioning software. The "Power access point locator" screen may allow a user to locate a power access point in the vicinity. The screen may display a map indicating the location of the nearest power access points. Optionally, a user may select the arrow icon on the map popup to be redirected to a "get directions" screen such as shown in FIG. 8H.

Figure 8I:
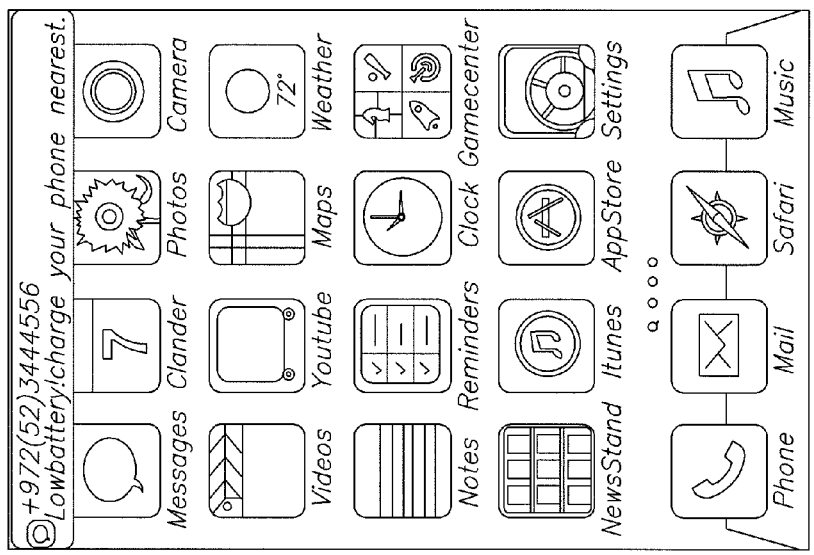
Figure 8K:
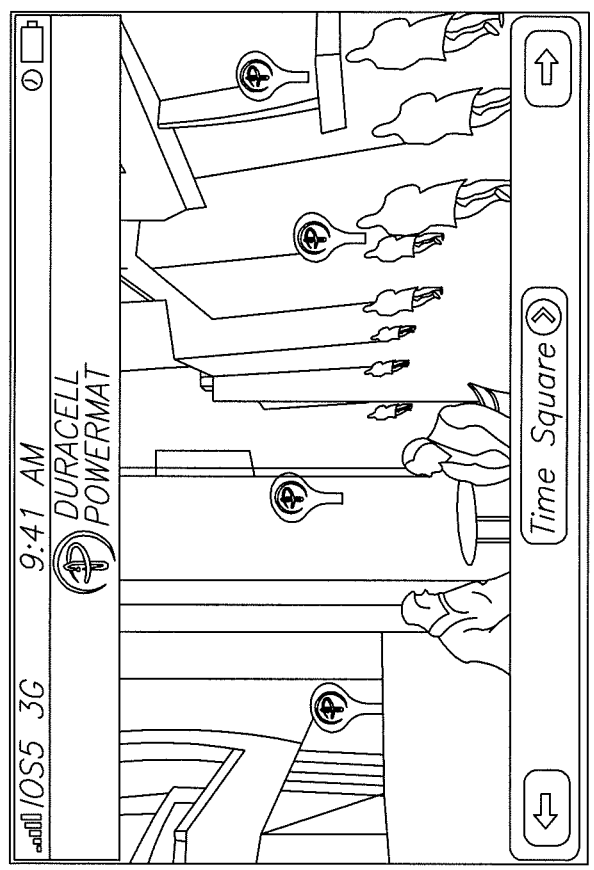
FIG. 8K is a possible example of a display of a locator feature using augmented reality to indicate the locations of nearby power provision points of a power provisioning software.

FIG. 8I shows a possible notification message overlaid upon a home screen of a communications device, such as a smart phone or the like. Text may be displayed such as: "Low battery! Charge your phone in the nearest power access point." Optionally the notification may include promotional material such as a message like "Low battery! Charge your phone in the nearest café and enjoy BUY 1 GET 1 promotion". The notification area may remain until a user clicks on it then a message such as "Find nearest charging station screen" may be displayed.

FIG. 8J shows a possible screen shot of a "Low Power" popup screen of a power provisioning software. The popup screen, may further include an option to "find nearest charging station", and may further direct to a "Store locator" screen, such as an augmented reality display of a camera view with icons denoting the location of stores having charging stations, as shown in FIG. 8K. The popup notification may have a close icon, such as an X or a selection button, for closing the notification and redirect the user to home screen.

Web Base Application

In order to better illustrate the possibilities of the web based application for a power provision system, FIGS. 9A-F show a selection of possible screen shots of a web based graphical user interface running on a web browser.

Figure 9A:
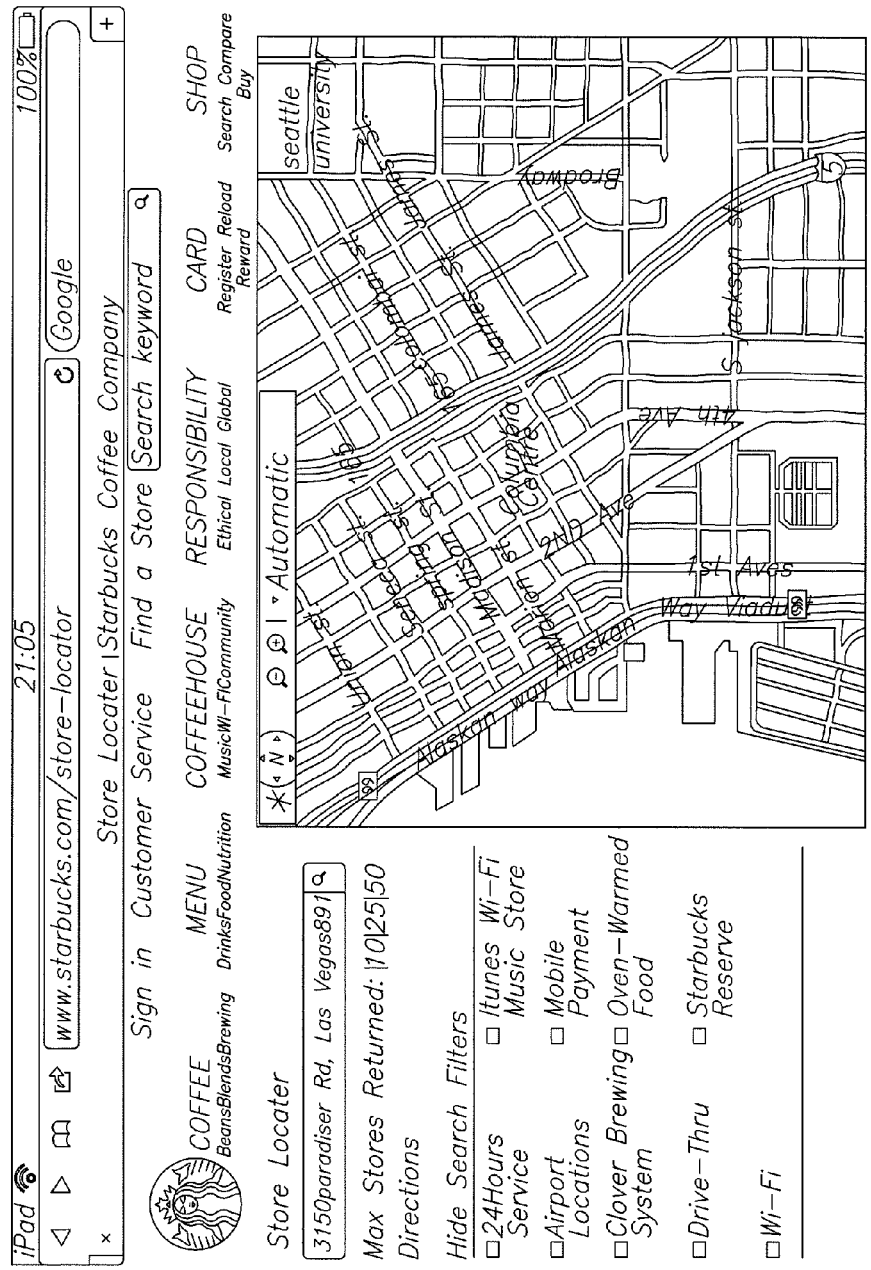
FIG. 9A is a possible main screen of a web application for a power provisioning software.

With particular reference to FIG. 9A, a possible main screen of a web application for a power provision system is shown. The main screen includes a search bar for locating a power access points and may show a map indicating a selected location. Search filters may be displayed having options to show/hide various selections. Each filter may have a an active checkbox. The map may include an interactive map, including zoom, pan, map views, for example.

Figure 9B:
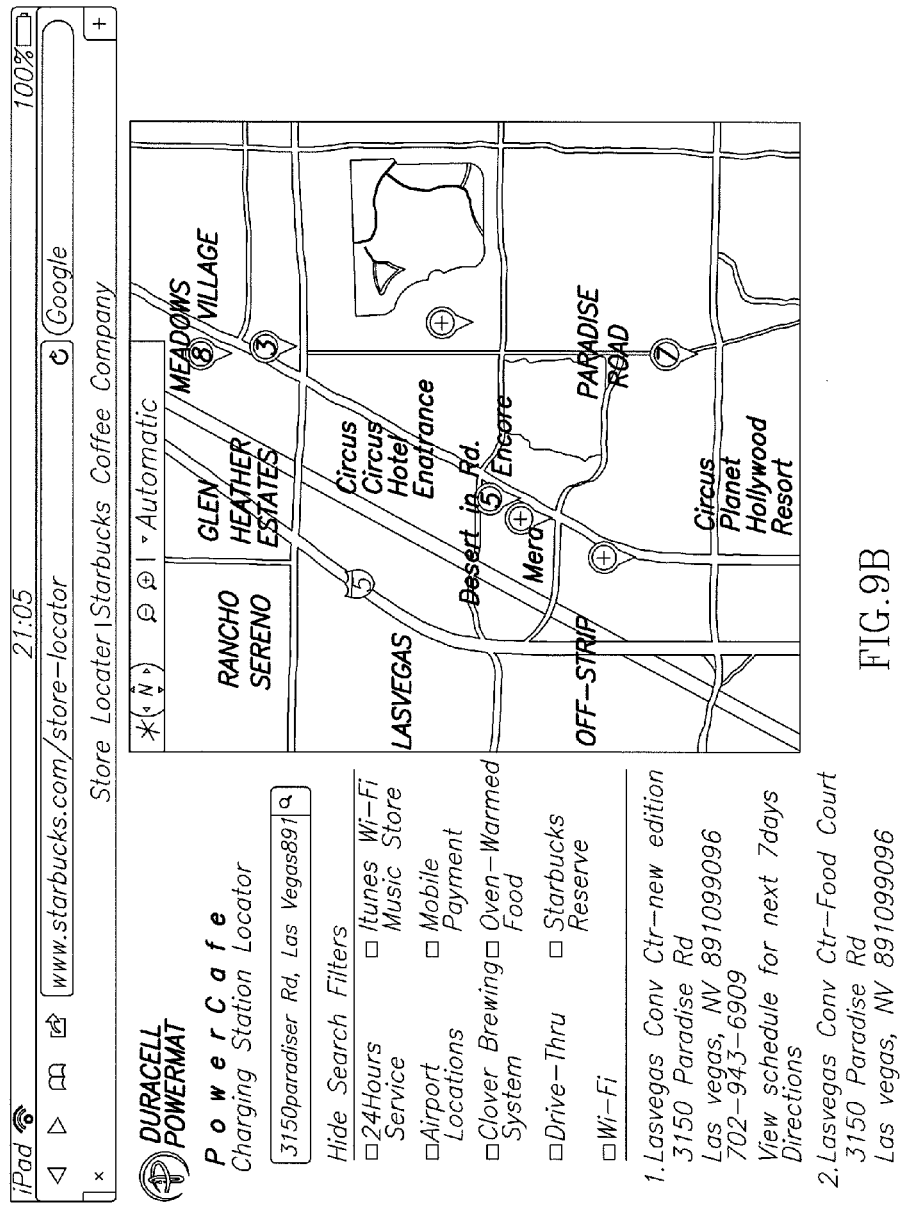
FIG. 9B is a web application for a power provision system in which a search has been performed.

FIG. 9B shows the web application for a power provision system of FIG. 9A in which a search has been performed. The search results may be displayed as list, perhaps below the search filter area (search filter area can be in hide/show view per user selection). Additionally or alternatively, the search results may be displayed on map as well. It is noted that the map may remain interactive allowing interactivity such as zoom, pan, and map views (standard, satellite and hybrid).

Figure 9C:
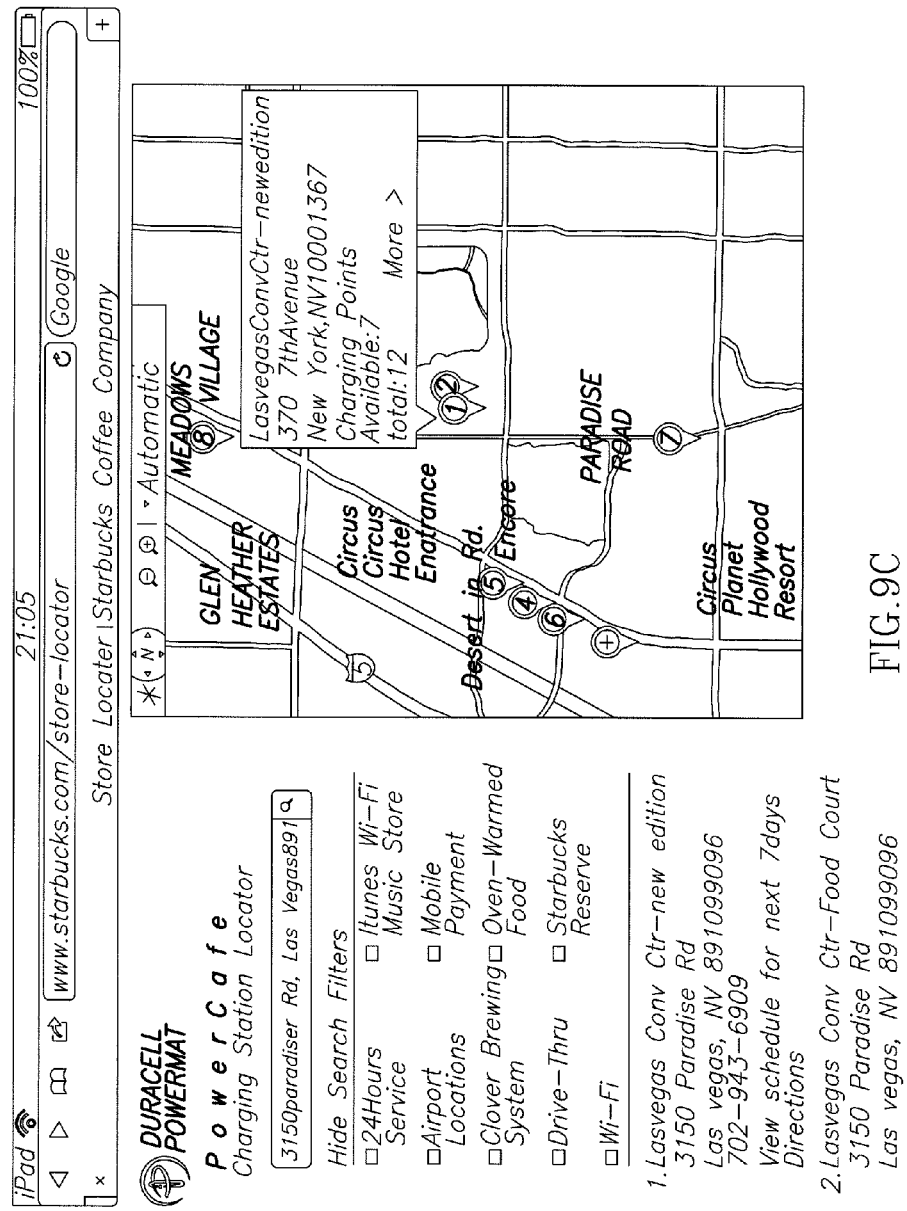
FIG. 9C is possible screen shot that displays a search result, showing how a result may be selected on a map or from a list.
Figure 9D:
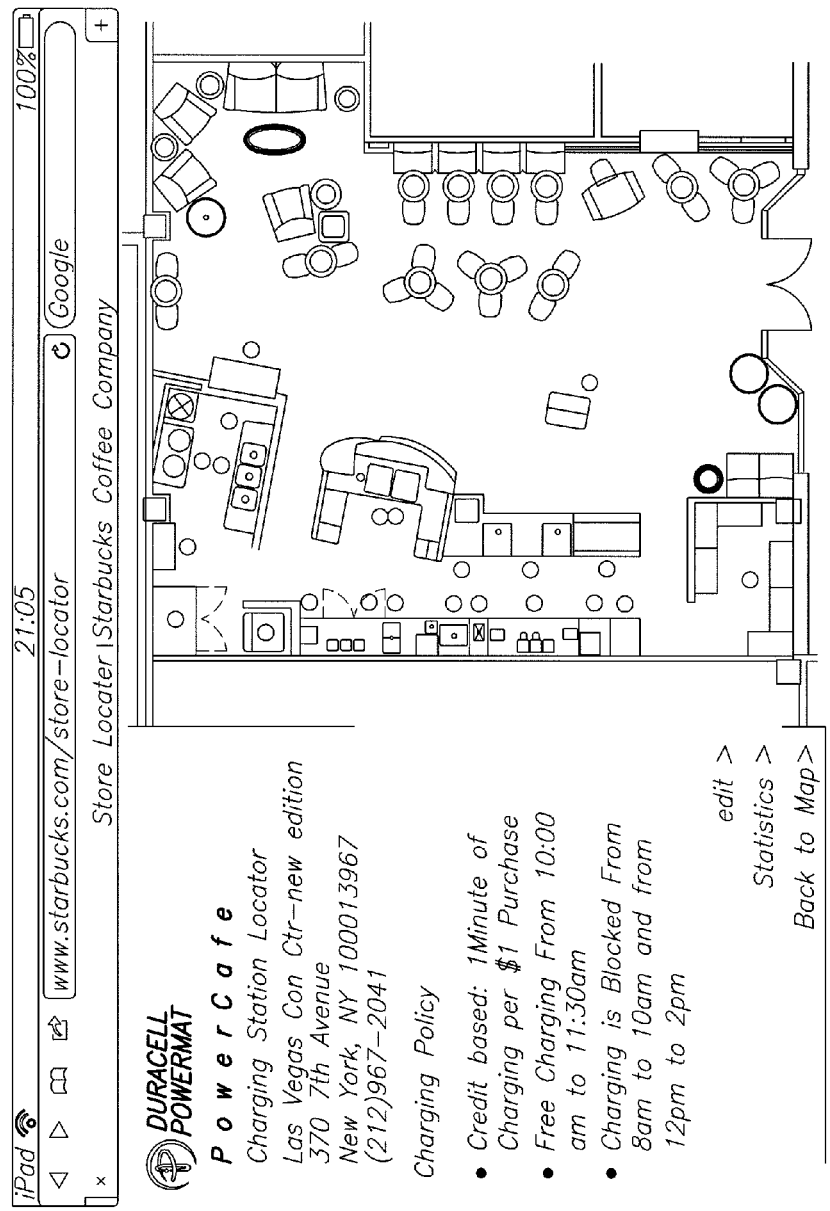
FIG. 9D is a possible floor plan of a web application for a power provisioning software.
Figure 9E:
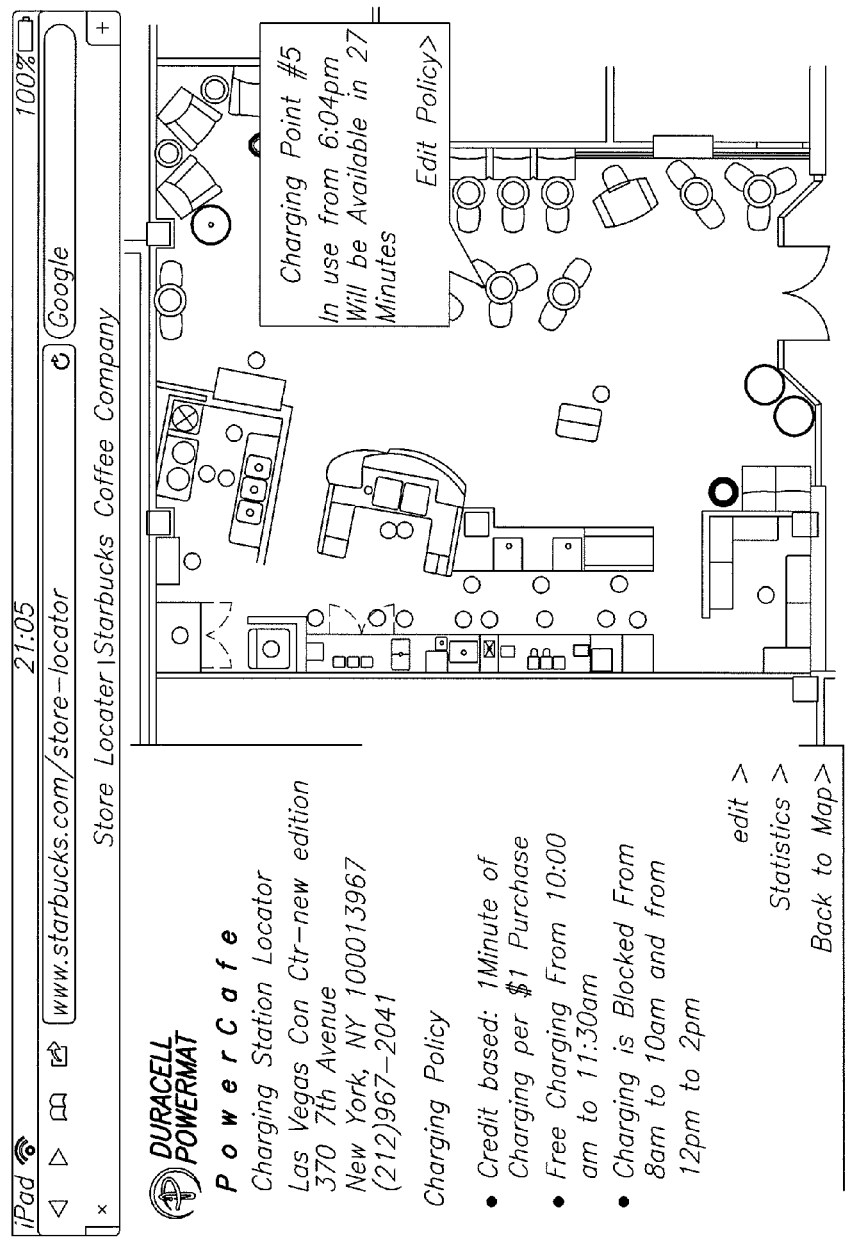
FIG. 9E is showing a possible charging point call out displayed for one of the power access points.
Figure 9F:
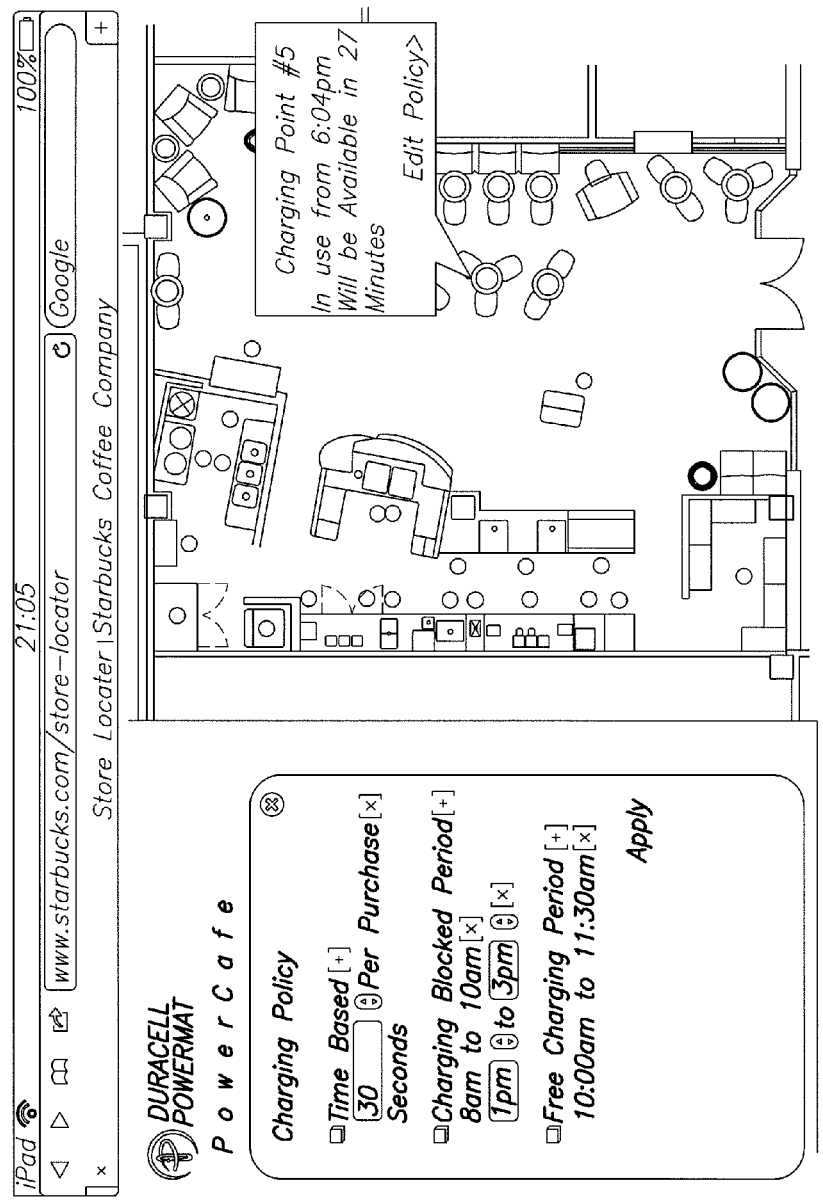
FIG. 9F is showing how the store's charging policy may be displayed on the side panel of the screen.

FIG. 9C shows how a result may be selected on the map or from the list. The selected item may be highlighted in the list and an overlay callout may be displayed, providing the name of the place, full address, power access points (available and in total), and the like. A 'more' option may be provided, via which a user may be directed, for example to a floor plan screen such as shown in FIG. 9D-F. Selecting a close icon or any place on map or other icon on map may allow a user to hide this callout. The map may remain interactive allowing interactivity such as zoom, pan, and map views (standard, satellite and hybrid).

Referring now to FIG. 9D, a possible floor plan of a web application for a power provision system is shown. Once a store is selected, the map may be replaced with a floor plan diagram. The floor plan may display all the power access or charging points as icons on tables of the floor plan for example. Indication of the availability of the power access points may be provided, perhaps by coloring the busy access points red and the free access points green, for example.

Optionally, the charging points on the floor plan may be selected and a callout with more info may be displayed such as indicated in FIG. 9E, for example. The side panel of the screen may include details of the store, such as name and address, and promotional information such as the charging policy of the store.

FIG. 9E shows a charging point call out displayed for one of the power access points. The callout provides point status such as whether it is available or busy. Furthermore, when occupied, the callout may further display the time for which it is to be used and perhaps the number of minutes and seconds remaining until it will be available.

FIG. 9F shows how the store's charging policy may be displayed on the side panel of the screen. The display may include options such as: credit based, block period and free mode options. The options may be selectable via check boxes. Optionally, each selection may include an 'add' link allowing further rules to be accessed for this mode.

The scope of the disclosed subject matter is defined by the appended claims and includes both combinations and sub combinations of the various features described hereinabove as well as variations and modifications thereof, which would occur to persons skilled in the art upon reading the foregoing description.

Technical and scientific terms used herein should have the same meaning as commonly understood by one of ordinary skill in the art to which the disclosure pertains. Nevertheless, it is expected that during the life of a patent maturing from this application many relevant systems and methods will be developed. Accordingly, the scope of the terms such as computing unit, network, display, memory, server and the like are intended to include all such new technologies a priori.

As used herein the term "about" refers to at least ±10%.

The terms "comprises", "comprising", "includes", "including", "having" and their conjugates mean "including but not limited to" and indicate that the components listed are included, but not generally to the exclusion of other components. Such terms encompass the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" may include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween. It should be understood, therefore, that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6 as well as non-integral intermediate values. This applies regardless of the breadth of the range.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An inductive power receiver having a signal transfer system to communicate with an inductive power outlet, the signal transfer system comprising circuitry configured to:
   construct a digital communication having multiple bits of information to allow data communication, each bit having a logic state selected from a logic state 1 and a logic state 0;
   assign peak pulses having a first characteristic frequency to represent the logic state 0 wherein said first characteristic frequency is selected from any one of a first set of characteristic frequencies;
   assign peak pulses having a second characteristic frequency to represent said logic state 1 wherein at least one of said second characteristic frequencies is selected from any one of a second set of characteristic frequencies; and
   transmit the digital communication from the inductive power receiver to said inductive power outlet; such that said peak pulses having any of said first set of characteristic frequencies are all interpreted as the logic state 0 and said peak pulses having any of said second set of characteristic frequencies are all interpreted as the logic state 1;
   wherein at least one of said first set of characteristic frequencies and said second set of characteristic frequencies comprises more than one characteristic frequency.

2. The inductive power receiver of claim 1 wherein said at least one of said first characteristic frequency is selected from any one of said first set of characteristic frequencies according to transmission requirements and wherein said at least one of said second characteristic frequency is selected from any one of said second set of characteristic frequencies according to transmission requirements.

3. The inductive power receiver of claim 1 wherein at least one of said first set of characteristic frequencies and said second set of characteristic frequencies, comprises at least one frequency encoding a P-UP signal used to instruct a driver of said inductive power outlet to increase power by an incremental value.

4. The inductive power receiver of claim 1 wherein at least one of said first set of characteristic frequencies and said second set of characteristic frequencies comprises at least one frequency encoding a P-DOWN signal used to instruct a driver of said inductive power outlet to decrease power by an incremental value.

5. The inductive power receiver of claim 1 wherein said first set of characteristic frequencies and said second set of characteristic frequencies comprises at least one frequency encoding a P-SAME signal used to instruct a driver of said inductive power outlet to continue at a same power.

6. The inductive power receiver of claim 1 wherein at least one of said first set of characteristic frequencies and said second set of characteristic frequencies comprises at least one frequency encoding a END-SIG signal used to instruct a driver of said inductive power outlet to terminate power transmission.

7. The inductive power receiver of claim 1 wherein at least one of said first set of characteristic frequencies and said second set of characteristic frequencies comprises at least one frequency selected from a group consisting of: 2 kilohertz, 4 kilohertz, 5 kilohertz, 6 kilohertz, 10 kilohertz and 50 kilohertz.

8. The inductive power receiver of claim 1 wherein said digital communication is transferred from the inductive receiver to the inductive outlet concurrently with power transmission instruction signals to control power levels of the inductive power outlet.

9. The inductive power receiver of claim 1 wherein said digital communication is constructed to communicate identification data.

10. The inductive power receiver of claim 1 wherein said digital communication is constructed to communicate operational data.

11. The inductive power receiver of claim 1 wherein said digital communication is constructed to communicate supplementary data.

12. The inductive power receiver of claim 1 wherein said digital communication is constructed to communicate data pertaining to power transfer.

13. The inductive power receiver of claim 1 wherein said digital communication comprises data pertaining to a code used to determine permissions of the inductive power receiver to draw power from inductive power outlet.

14. The inductive power receiver of claim 1 wherein said digital communication comprises data pertaining to a code used to perform user specific actions associated with local environment of the user.

15. The inductive power receiver of claim 1 wherein said digital communication comprises data pertaining to a code used for billing purposes.

16. The inductive power receiver of claim 1 wherein said digital communication comprises data pertaining to a code used to determine personalized advertising targeted to a user.

17. A method for communicating digital signals from an inductive power receiver, comprising:
- constructing a digital communication comprising multiple bits of information to allow data communication, each bit having a logic state selected from a logic state 0 and a logic state 1;
- assigning peak pulses having a first characteristic frequency to represent the logic state wherein said first characteristic frequency is selected from any one of a first set of characteristic frequencies;
- assigning peak pulses having a second characteristic frequency to represent the logic state 0 wherein said second characteristic frequency is selected from any one of a second set of characteristic frequencies;
- transmitting said digital communication from said inductive power receiver such that said peak pulses having any frequency of said first set of characteristic frequencies are all interpreted as the logic state 0 and said peak pulses having any of said second set of characteristic frequencies are all interpreted as the logic state 1;
- wherein at least one of said first set of characteristic frequencies and said second set of characteristic frequencies comprises more than one characteristic frequency.

18. The method of claim 17 wherein assigning peak pulses comprises:
- selecting a first characteristic frequency from said first set of characteristic frequencies according to a power transmission requirement;
- representing one of the first and second logic states with the selected first characteristic frequency;
- selecting a second characteristic frequency from said second set of characteristic frequencies according to said power transmission requirement; and
- representing said logic state 1 with the selected second characteristic frequency.

19. The method of claim 17 wherein assigning peak pulses comprises:
- selecting a characteristic frequency encoding a P-UP signal used to request an increase in power by an incremental value; and
- representing said logic state 0 or logic state 1 with said P-UP signal.

20. The method of claim 17 wherein assigning pulses comprises:
- selecting a characteristic frequency encoding a P-DOWN signal used to request a decrease in power by an incremental value; and
- representing said logic state 0 or logic state 1 with said P-DOWN signal.

21. The method of claim 17 wherein assigning pulses comprises:
- selecting a characteristic frequency encoding a P-SAME signal used to request no change in power; and
- representing said logic state 0 or logic state 1 with said P-SAME signal.

22. The method of claim 17 wherein assigning pulses comprises:
- selecting a characteristic frequency encoding a END-SIG signal used to request termination of power transmission; and
- representing said logic state 0 or logic state 1 with said END-SIG signal.

23. The method of claim 17 wherein assigning peak pulses comprises representing said logic state 0 or logic state 1 by a characteristic frequency selected from a group consisting of: 2 kilohertz, 4 kilohertz, 5 kilohertz, 6 kilohertz, 10 kilohertz and 50 kilohertz.

24. The method of claim 17 wherein said digital communications are transferred from the inductive receiver concurrently with power transmission instruction signals to control power levels of an inductive power outlet.

25. The method of claim 17 wherein constructing a digital communication comprises constructing a communication comprising data pertaining to identification data.

26. The method of claim 17 wherein constructing a digital communication comprises constructing a communication comprising data pertaining to operational data.

27. The method of claim 17 wherein constructing a digital communication comprises constructing a communication comprising data pertaining to power transfer management.

28. The method of claim 17 wherein constructing a digital communication comprises constructing a communication comprising a code used to determine permissions of the inductive power receiver to draw power.

29. The method of claim 17 wherein constructing a digital communication comprises constructing a communication comprising a code used for billing purposes.

30. The method of claim 17 wherein constructing a digital communication comprises constructing a communication comprising a code used to determine personalized advertising targeted to a user.

* * * * *

UNITED STATES PATENT AND TRADEMARK OFFICE
CERTIFICATE OF CORRECTION

| | |
|---|---|
| PATENT NO. | : 9,088,168 B2 |
| APPLICATION NO. | : 14/273280 |
| DATED | : July 21, 2015 |
| INVENTOR(S) | : Eliese Mach et al. |

It is certified that error appears in the above-identified patent and that said Letters Patent is hereby corrected as shown below:

In The Claims

Column 38, Line 25, Claim 6:

After "frequency encoding"
Delete "a" and
Insert -- an --.

Column 40, Line 11, Claim 22:

After "frequency encoding"
Delete "a" and
Insert -- an --.

Signed and Sealed this
Fifth Day of January, 2016

Michelle K. Lee
*Director of the United States Patent and Trademark Office*